(12) United States Patent
Graham

(10) Patent No.: US 10,334,834 B2
(45) Date of Patent: Jul. 2, 2019

(54) FISHING TOOL ASSEMBLY

(71) Applicant: Billy Chad Graham, McCook, NE (US)

(72) Inventor: Billy Chad Graham, McCook, NE (US)

(*) Notice: Subject to any disclaimer, the term of this patent is extended or adjusted under 35 U.S.C. 154(b) by 818 days.

(21) Appl. No.: 14/922,532

(22) Filed: Oct. 26, 2015

(65) Prior Publication Data
US 2017/0112115 A1 Apr. 27, 2017

(51) Int. Cl.
B25B 7/02 (2006.01)
A01K 95/02 (2006.01)
A01K 97/00 (2006.01)
A01K 99/00 (2006.01)
B25B 7/08 (2006.01)
B25B 27/02 (2006.01)

(52) U.S. Cl.
CPC .............. *A01K 95/02* (2013.01); *A01K 97/00* (2013.01); *A01K 99/00* (2013.01); *B25B 7/02* (2013.01); *B25B 7/08* (2013.01); *B25B 27/02* (2013.01); *Y10T 29/49915* (2015.01)

(58) Field of Classification Search
CPC ........ A01K 95/02; A01K 97/00; A01K 99/00; B25B 7/02; B25B 7/08; B25B 27/02; Y10T 29/49915
USPC ................................ 43/44.96, 44.97; 29/509
See application file for complete search history.

(56) References Cited

U.S. PATENT DOCUMENTS 3,583,202 A * 6/1971 Blakeway ................ B21D 9/08
                                                       72/410
3,664,006 A * 5/1972 Valle ........................ B23Q 7/10
                                                      29/212 D

* cited by examiner

*Primary Examiner* — Bayan Salone
(74) *Attorney, Agent, or Firm* — Polson Intellectual Property Law P.C.; Christopher Sylvain; Margaret Polson

(57) ABSTRACT

The disclosed technology includes an apparatus and method for applying a fishing sinker directly to a fishing line. In one implementation, the apparatus comprises a lower lever, an upper lever configured to rotate around an axis of a hinge in a direction toward the lower lever, and a jaw located on a first end of the upper lever and terminating with a tooth, the tooth configured to move into an aperture in the lower lever to compress the fishing sinker located in the lower lever into a closed position around a fishing line.

20 Claims, 23 Drawing Sheets

2200

FISHING TOOL ASSEMBLY

BACKGROUND OF THE INVENTION

Many fishermen add weighted sinkers to fishing lines to stabilize, support, and/or submerge the fishing lines on or under water. A split shot sinker is a weighted sinker that can be spherical or oval in shape, with a slot formed central in the split shot sinker, partially dividing the split shot sinker into two hemispheres. The slot provides an opening in which a fishing line can be inserted and the split shot sinker can be compressed or crimped shut around the fishing line for attachment.

SUMMARY

The technology disclosed herein includes an apparatus comprising a lower lever, an upper lever is configured to rotate around an axis of a hinge in a direction toward the lower lever, and a jaw located on a first end of the upper lever configured to move into an aperture in the lower lever to compress a fishing sinker located in the lower lever into a closed position around a fishing line.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Descriptions of various implementations as further illustrated in the accompanying drawings and defined in the appended claims.

These and various other features and advantages will be apparent from a reading of the following Detailed Descriptions.

BRIEF DESCRIPTIONS OF THE DRAWINGS

DETAILED DESCRIPTIONS

Fishing sinkers (e.g., a traditional split shot, a convenient rubber core, or a more sophisticated tied sinker) can be a significant element in a fishing tackle system. Sinkers add weight to fishing lines to stabilize, support, and/or submerge the fishing lines on or under water.

Split shot sinkers can be attached to a fishing line by pressing the fishing line into a centrally located groove in the split shot sinker. Two sides of each split shot sinker are squeezed to compress the material of the sinker (e.g., metal) until the sinker grips the fishing line tightly, and is securely fastened. Placement of the sinkers on the line can vary. Arrangements can include, for example, a single sinker between a hook and a bobber for bait fishing, as well as a series of sinkers with different weights to control drift below a float.

When adding split shot sinkers to a fishing line, a fisherman can crimp the split shot sinker with his fingers, by using a separate pair of pliers, or even by his teeth. Performing this task by hand or teeth can result in insufficient closure around the fishing line, leading to later detachment from the fishing line. This method also can lead to pain and discomfort in the fingers, especially in inclement weather. Using a separate pair of pliers to attach a split shot sinker requires the use of two hands, one holding the sinker, the other holding the pliers, which is often burdensome when trying to simultaneously hold a fishing line and a fishing rod.

The disclosed technology includes a fishing tool assembly comprising a combination of two levers and a spring-loaded fishing tool cartridge holding split shot sinkers. A user can squeeze one lever of the fishing tool assembly via a spring-loaded mechanism and effectively and efficiently attach a fishing sinker directly to a fishing line. The fishing tool assembly is compact, easy to use and maintain, and operable with one hand.

Figure 1:
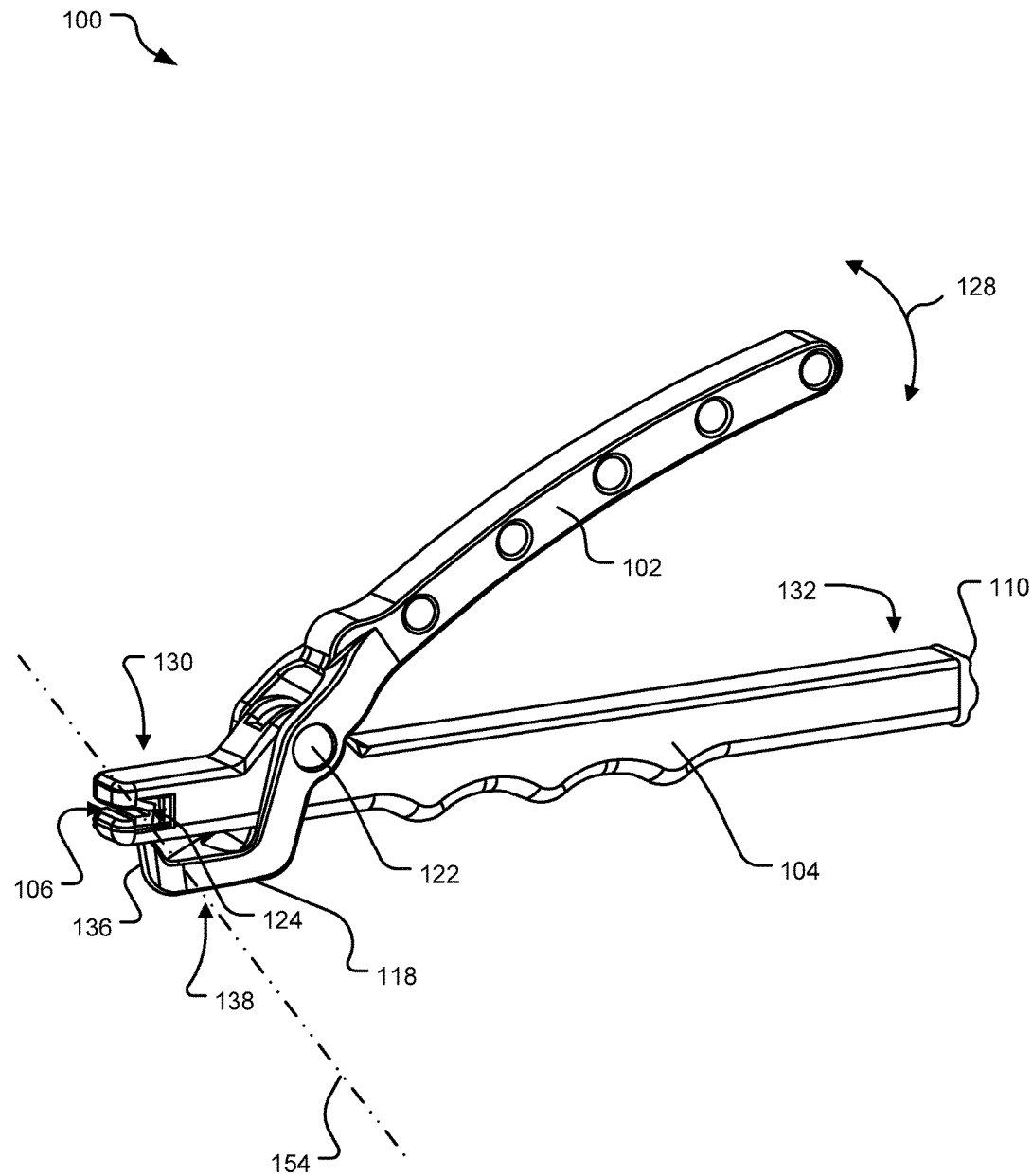
FIG. 1 illustrates a perspective view of an example fishing tool assembly.

FIG. 1 illustrates a perspective side view of an example fishing tool assembly 100. An upper lever 102 is attached to a lower lever 104 by a hinge 122. The hinge 122 can operate using a variety of mechanisms (e.g., a threaded screw, a press fit pin, etc.). In FIGS. 1-6, the hinge 122 includes a press fit pin. The press fit pin may be fitted through two holes on the upper lever 102 and one hole in the lower lever 104. The upper lever 102 and lower lever 104 can move around an axis of the hinge 122 independently or simultaneously to and from original open positions (not shown) and closed positions (e.g., the closed position shown in FIG. 1). Arrows 128 in FIG. 1 show that upper lever 102 is capable of moving independently from the lower lever 104, and vice versa. When the upper lever 102 and lower lever 104 are in a closed position, the upper lever 102 is configured to compress a fishing sinker, described more in detail below.

The upper lever 102 and the lower lever 104 are separated by spring force from a spring (not shown) located through the lower lever 104 and the upper lever 102. The spring can include a variety of spring types (e.g., tension springs, compression springs, torsion springs, etc.). In FIGS. 1-6, the illustrated springs 212, 312, 412, and 512 are torsion springs.

A slot 106 is located on a first end 130 of the lower lever 104 and is configured to receive a fishing line 154 (depicted as a dotted line). A spring-loaded, reloadable fishing tool cartridge (not shown) configured to house fishing sinkers (not shown) can be inserted inside a second end 132 of the lower lever 104 when a cap 110 is removed. The fishing tool cartridge can slide to the first end 130 of the lower lever 104 until a dispensing end of the fishing tool cartridge aligns with the slot 106.

During use, a spring behind the fishing tool cartridge will automatically expand and push or load a fishing sinker into a dispensing end of the fishing tool cartridge, which is in alignment with the slot 106 located at the first end 130 of the lower lever 104. In some implementation, there may be sinkers stacked in the fishing tool cartridge. The fishing line 154 can be inserted into the slot 106 and into the opening of the fishing sinker.

The upper lever 102 has a jaw 118 terminating with a tooth 136 on a first end 138 of the upper lever 102 moveably configured to enter through an aperture (see aperture 2126 shown and described in FIG. 21) in the bottom of the first end 130 of the lower lever 104. Once the fishing line 154 is in place, downward pressure is applied to the upper lever 102 to rotate around the hinge 122, causing the jaw 118 to close and the tooth 136 to move upward into the aperture in the lower lever 104. The tooth 136, moving through this aperture, contacts the underside of the fishing sinker and applies upward pressure. This upward pressure causes the jaw 118 to compress or crimp the fishing sinker located in the slot 106 into a closed position around the fishing line 154.

When pressure is released, the jaw 118 opens and the tooth 136 lowers from the aperture in the lower lever 104, and the sinker and fishing line 154 can be removed from a side opening 124 in the first end 130 of the lower lever 104. Or, alternatively, the fishing line 154 can slide perpendicular to the lower lever 104, removing only the attached sinker from the side opening 124 but maintaining the fishing line 154 in the slot 106 for subsequent attachment of one or more additional fishing sinkers to the fishing line 154.

After a sinker attached to a fishing line 154 is removed from the fishing tool assembly 100, the forward pressure from the loading spring in the fishing tool cartridge moves another fishing sinker into a forward loading position in the slot 106.

The fishing tool assembly descriptions described herein are specifically tailored to rectangular-shaped sinkers with rounded corners and rectangular-shaped cartridges. However, in other implementations, a variety of fishing sinker and cartridge sizes and shapes may be used, specific to a variety of fishing applications. Additionally, the shape, design, and aesthetics of the upper lever 102 and the lower lever 104 may be tailored to a specific use or comfort. For example, as shown in FIG. 1, the lower lever 104 is shaped for a comfortable hand fit. Or, in another example, both the upper lever 102 and the lower lever 104 may be shaped to fit a user's hand.

Figure 2:
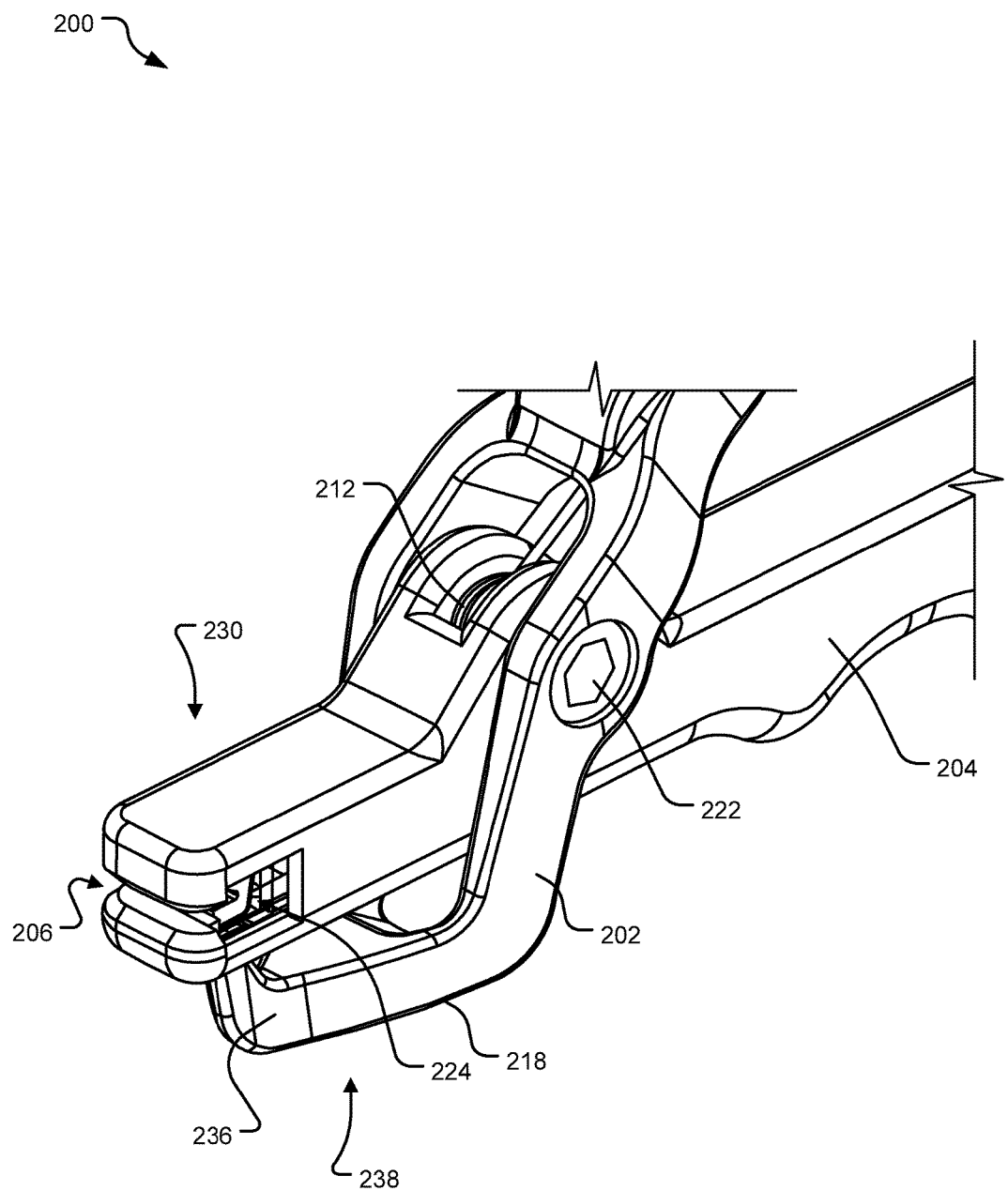
FIG. 2 illustrates a partial side perspective view of an example fishing tool assembly.

FIG. 2 illustrates a partial perspective side view of an example fishing tool assembly 200. An upper lever 202 is attached to a lower lever 204 by a hinge 222. The hinge 222 can operate in a variety of mechanisms (e.g., a threaded screw, a press fit pin, etc.). In FIGS. 1-6, the hinge 222 includes a press fit pin. The upper lever 202 and lower lever 204 can move independently or simultaneously to and from open positions and closed positions.

The upper lever 202 has a jaw 218 terminating with a tooth 236 on a first end 238 of the upper lever 202 moveably configured to enter through an aperture (e.g., aperture 2126 shown and described in FIG. 21) in the bottom of the first end 230 of the lower lever 204.

A spring 212 is configured around the hinge 222 in the lower lever 204, and extends into the upper lever 202. The spring 212 facilitates the upper lever 202 to automatically return to an open position after use. The spring can include a variety of springs (e.g., tension springs, compression springs, torsion springs, etc.). In FIGS. 2-5, the springs 212, 312, 412, and 512 are torsion springs. A slot 206 is located on a first end 230 of the lower lever 204 and is configured to receive a fishing line (not shown).

During use, a spring in a fishing tool cartridge (not shown) inside the lower lever 204 will expand and push or load a fishing sinker into a dispensing end of the fishing tool cartridge, which is in alignment with the slot 206 located at the first end 230 of the lower lever 204. A fishing line can be inserted into the slot 206 and into the opening of the fishing sinker.

Once the fishing line is in place, downward pressure is applied to the upper lever 202 to rotate around the hinge 222, causing the jaw 218 to close and the tooth 236 to move upward into an aperture in the bottom of the lower lever 204. The tooth 236, moving through this aperture, contacts the underside of the fishing sinker and applies upward pressure. This upward pressure causes the jaw 218 to compress or crimp the fishing sinker located in the slot 206 into a closed position around the fishing line.

When pressure is released, the jaw 218 opens and the tooth 236 lowers from the aperture in the lower lever 204, and the sinker and line can be removed from a side opening 224 in the first end 230 of the lower lever 204. Or, the fishing line can slide perpendicular to the lower lever 204, removing only the attached sinker from the side opening 224 but maintaining the fishing line in the slot 206 for subsequent attachment of one or more additional sinkers to the fishing line.

After a sinker attached to a fishing line is removed from the fishing tool assembly 200, the forward pressure from the loading spring in the fishing tool cartridge moves another fishing sinker into a forward loading position in the slot 206.

Figure 3:
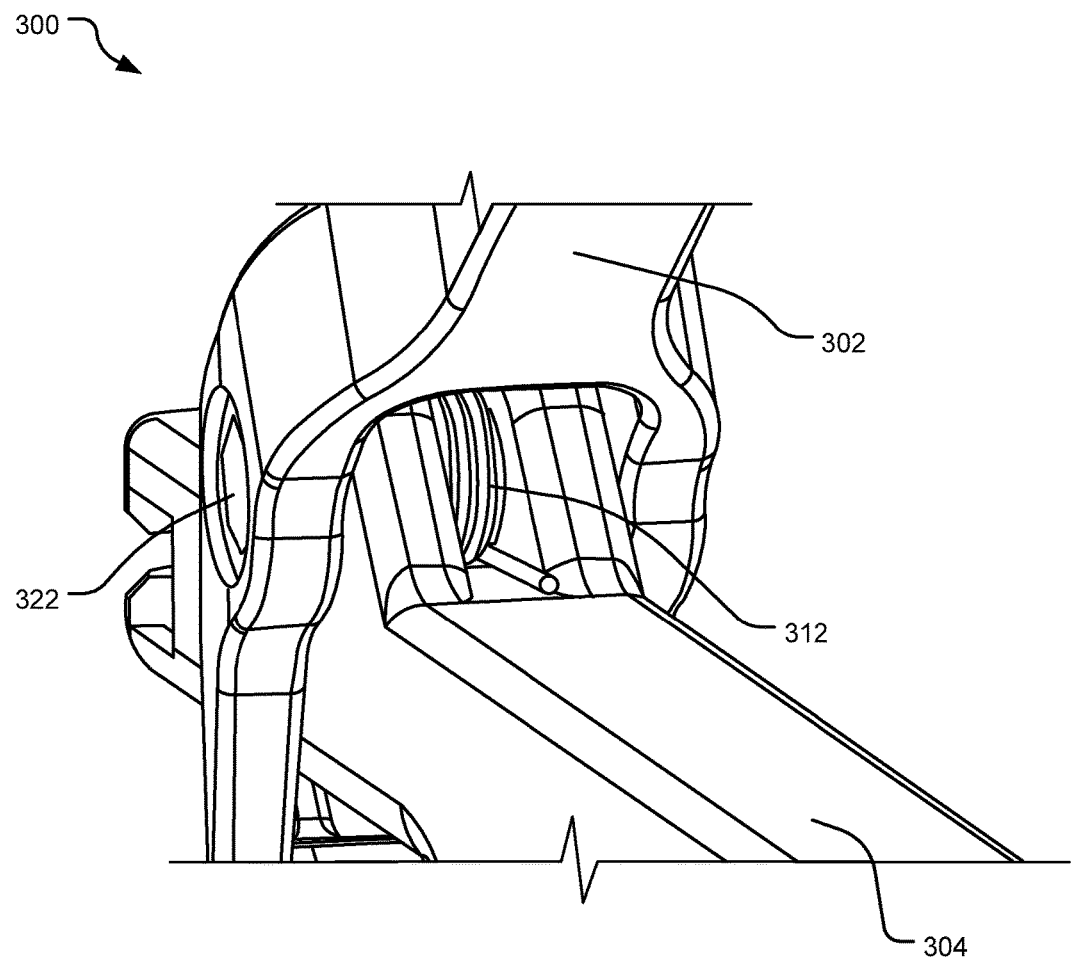
FIG. 3 illustrates a partial rear perspective view of an example fishing tool assembly.

FIG. 3 illustrates a partial perspective rear view of an example fishing tool assembly 300. An arrangement of a spring 312 in relation to the hinge 322, lower lever 304, and upper lever 302 is shown. The spring 312 is configured in the lower lever 304 around the hinge 322 and contacts the upper lever 302. When downward pressure is applied to the upper lever 302, or when upward pressure is applied to the lower lever 302, the spring 312 is compressed, providing opposing force. This opposing force allows the upper lever 302 or the lower lever 304, whichever lever is moved towards a closed position, to later return to an original open position once pressure has ceased.

Figure 4:
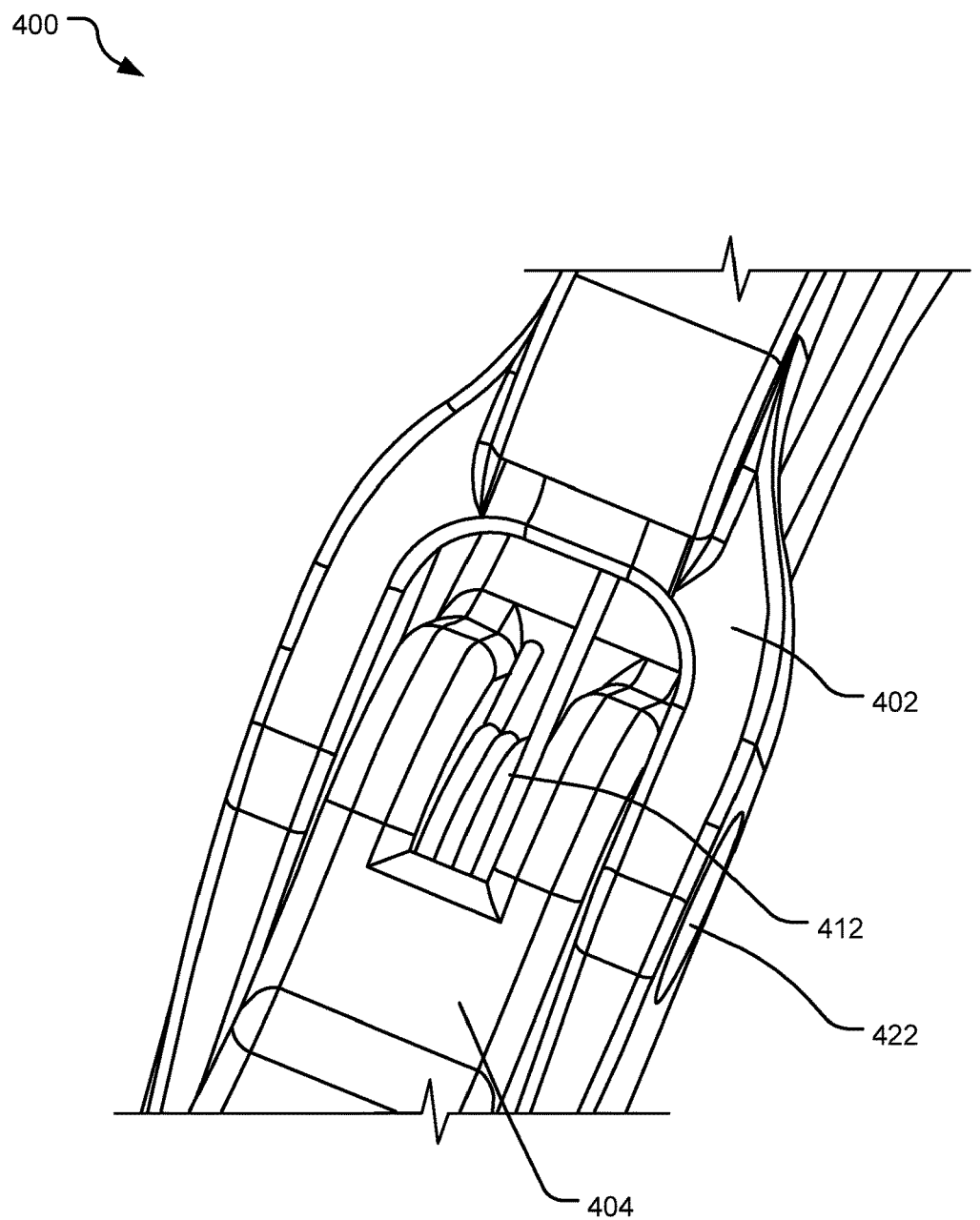
FIG. 4 illustrates a partial top view of an example fishing tool assembly.

FIG. 4 illustrates a partial top view of an example fishing tool assembly 400. An arrangement of a spring 412 in relation to a hinge 422, lower lever 404, and upper lever 402 is shown. The spring 412 is configured in the lower lever 404 around the hinge 422 and contacts the upper lever 402. When downward pressure is applied to the upper lever 402, or when upward pressure is applied to the lower lever 402, the spring 412 is compressed, providing opposing force. This opposing force allows the upper lever 402 or the lower lever 404, whichever lever is moved towards a closed position, to later return to an original open position once pressure has ceased.

Figure 5:
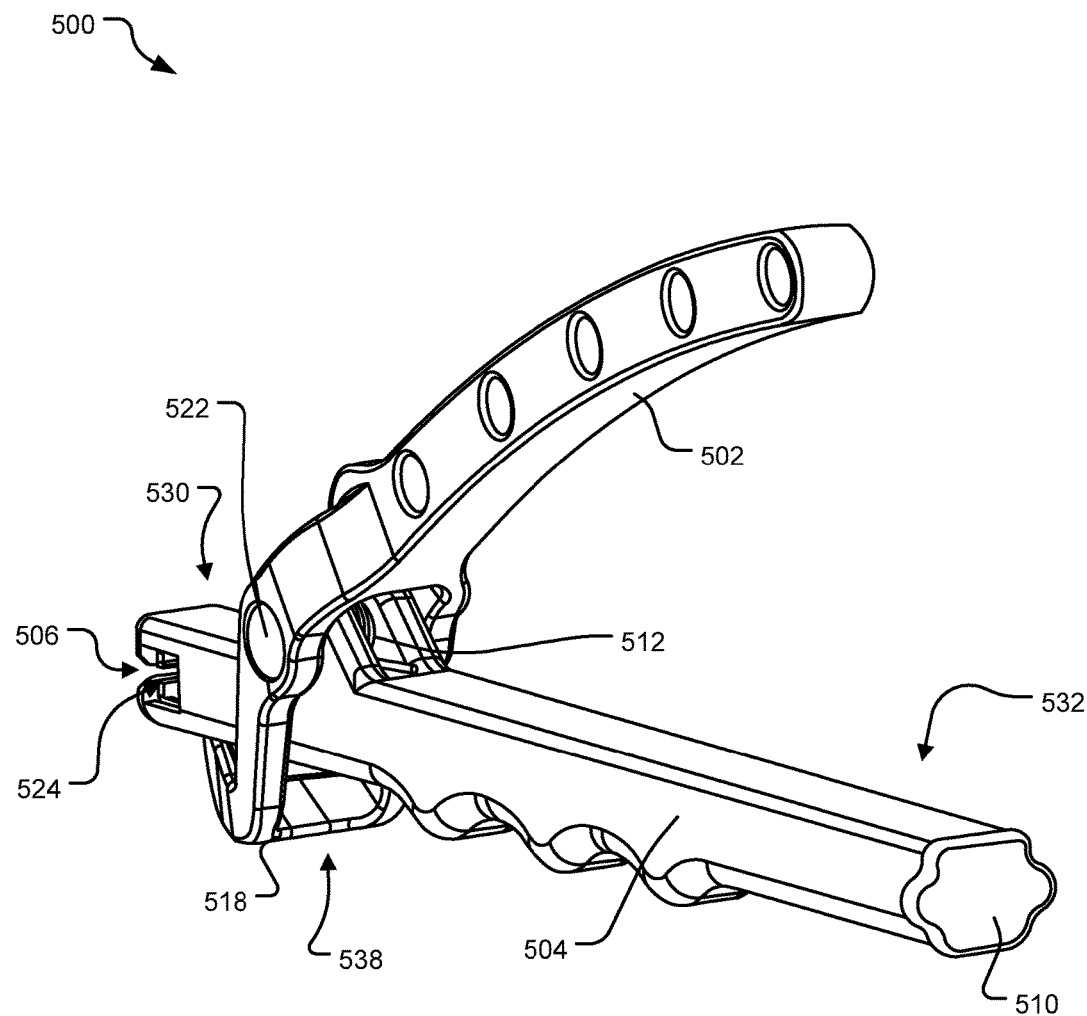
FIG. 5 illustrates a side perspective view of an example fishing tool assembly.

FIG. 5 illustrates a side perspective view of an example fishing tool assembly 500. An upper lever 502 is attached to a lower lever 504 by a hinge 522. The hinge 522 can operate in a variety of mechanisms (e.g., a threaded screw, a press fit pin, etc.). In FIGS. 1-6, the hinge 522 includes a press fit pin. The upper lever 502 and lower lever 504 can move independently or simultaneously to and from open positions (e.g., the open position shown in FIG. 5) and closed positions (not shown).

The upper lever 502 and the lower lever 504 are separated by spring force from a spring 512 located through the lower lever 504 and the upper lever 502. The spring can include a variety of spring types (e.g., tension springs, compression springs, torsion springs, etc.). In FIGS. 2-5, the springs 212, 312, 412, and 512 are torsion springs.

A slot 506 is located on a first end 530 of the lower lever 504 and is configured to receive a fishing line (not shown). A spring-loaded, reloadable fishing tool cartridge (not shown) configured to house fishing sinkers (not shown) can be inserted inside a second end 532 of the lower lever 504 when a cap 510 is removed.

During use, a spring behind the fishing tool cartridge will expand and push or load a fishing sinker into a dispensing end of the fishing tool cartridge, which is in alignment with the slot 506 located at the first end 530 of the lower lever 504. A fishing line can be inserted into the slot 506 and into the opening of the fishing sinker.

The upper lever 502 has a jaw 518 terminating with a tooth (not shown) on a first end 538 of the upper lever 502 moveably configured to enter through an aperture (e.g., aperture 2126 shown and described in FIG. 21) in the bottom of the first end 530 of the lower lever 504.

Once the fishing line 554 is in place, downward pressure is applied to the upper lever 502 to rotate around the hinge 522, causing the jaw 518 to close and the tooth to move upward into the aperture in the lower lever 504. The tooth, moving through this aperture, contacts the underside of the fishing sinker and applies upward pressure. This upward pressure causes the jaw 518 to compress or crimp the fishing sinker located in the slot 506 into a closed position around the fishing line.

Once the fishing line is in place, downward pressure is applied to the upper lever 502 to rotate around the hinge 522, causing the jaw 518 to move upwardly into the aperture in the lower lever 504. The jaw 518, moving through this aperture, contacts the underside of the fishing sinker and applies upward pressure. This upward pressure causes the jaw 518 to compress or crimp the fishing sinker located in the slot 506 into a closed position around the fishing line.

When pressure is released, the jaw 518 opens and the tooth lowers from the aperture in the lower lever 504, and the sinker and line can be removed from a side opening 524 in the first end 530 of the lower lever 504. Or, the fishing line can slide perpendicular to the lower lever 504, removing only the attached sinker from the side opening 524 but maintaining the fishing line in the slot 506 for subsequent attachment of one or more additional sinkers to the fishing line.

After a sinker attached to a fishing line is removed from the fishing tool assembly 500, the forward pressure from the loading spring in the fishing tool cartridge moves another fishing sinker into a forward loading position in the slot 506.

Figure 6:
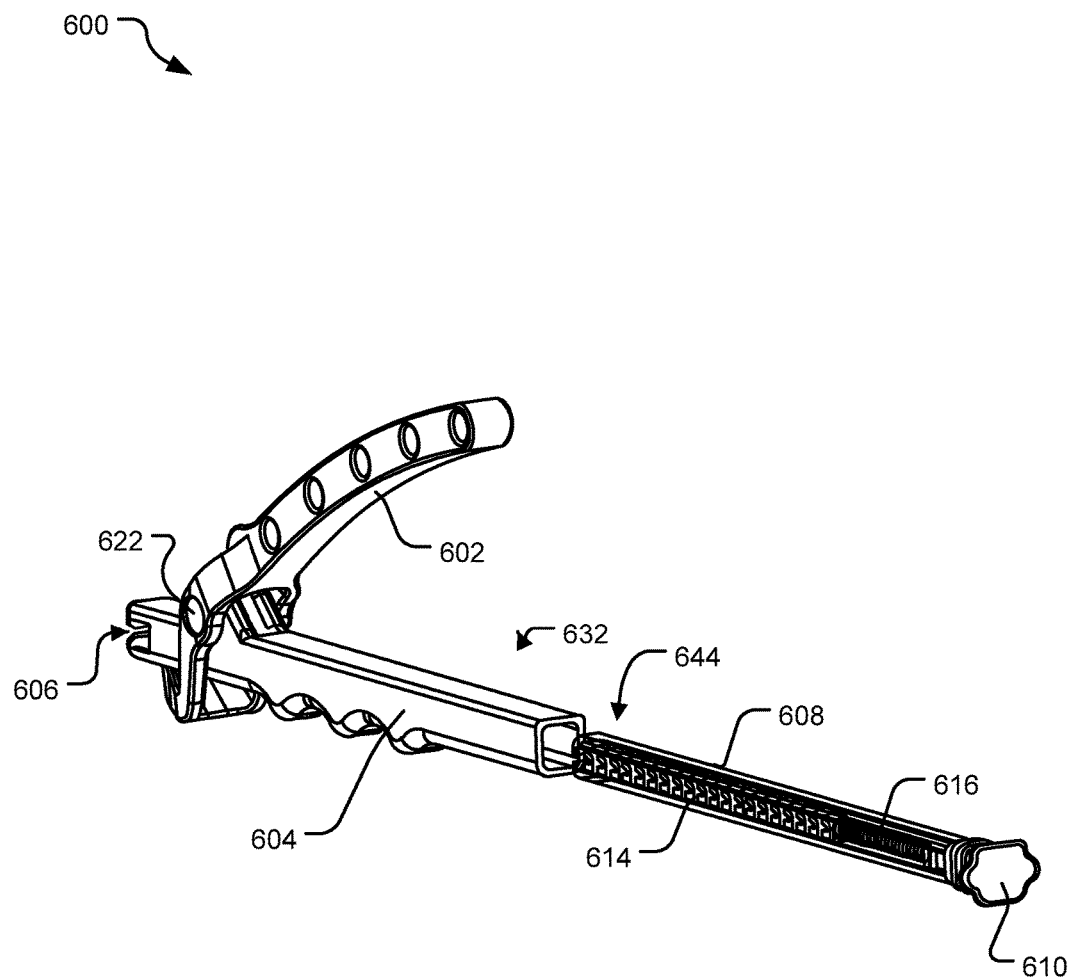
FIG. 6 illustrates a side perspective view of an example fishing tool assembly, including a perspective of a fishing tool cartridge.

FIG. 6 illustrates a perspective side view of an example fishing tool assembly 600, including a view of a pre-loaded fishing tool cartridge 608. An upper lever 602 is attached to a lower lever 604 by a hinge 622. The pre-loaded fishing tool cartridge 608 can be inserted into the open second end 632 of the lower lever 604.

Stacked fishing sinkers 614 are loaded in the fishing tool cartridge 608 adjacent to a spring-loaded mechanism 616. An end cap or plug 610 holds the pre-loaded fishing tool cartridge 608, including the stacked fishing sinkers 614 and spring-loaded mechanism 616, in place in the lower lever 604. Once the fishing tool cartridge 608 is assembled in the lower lever 604, the forward pressure from the spring-loaded mechanism 616 in the fishing tool cartridge 608 moves a fishing sinker 614 into a forward loading position in a slot 606. After a fishing sinker 614 is attached on a fishing line and removed from the slot 606, the spring-loaded mechanism 616 in the fishing tool cartridge 608 automatically moves the next fishing sinker 614 out a dispensing end 644 of the fishing tool cartridge 608 into a forward loading position in a slot 606.

Figure 7:
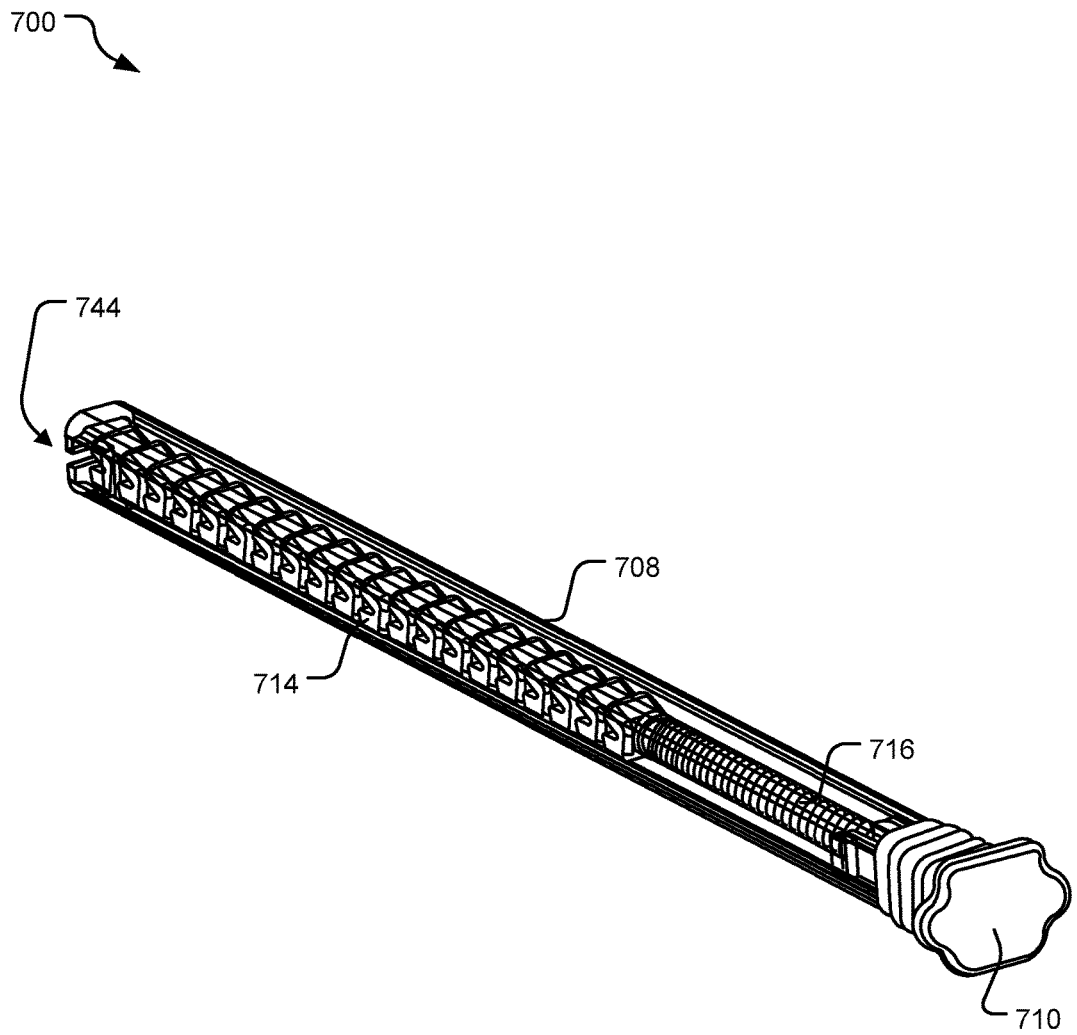
FIG. 7 illustrates a perspective view of an example fishing tool cartridge.

FIG. 7 illustrates a perspective view of an example fishing tool cartridge 700. Stacked fishing sinkers 714 are loaded in the fishing tool cartridge 708 adjacent to a spring-loaded mechanism 716. An end cap or plug 710 acts as a means of holding the pre-loaded fishing tool cartridge 708, including stacked fishing sinkers 714 and spring-loaded mechanism 716, in place in a lower lever (not shown). Once the fishing tool cartridge 708 is assembled in a lower lever, the forward pressure from the spring-loaded mechanism 716 in the fishing tool cartridge 708 moves a fishing sinker 714 into a forward loading position in a slot (not shown). After a fishing sinker 714 is attached on a fishing line and removed from the slot, the spring-loaded mechanism 716 in the fishing tool cartridge 708 automatically moves the next fishing sinker 714 out a dispensing end 744 of the fishing tool cartridge 708 into a forward loading position in the slot.

Figure 8:
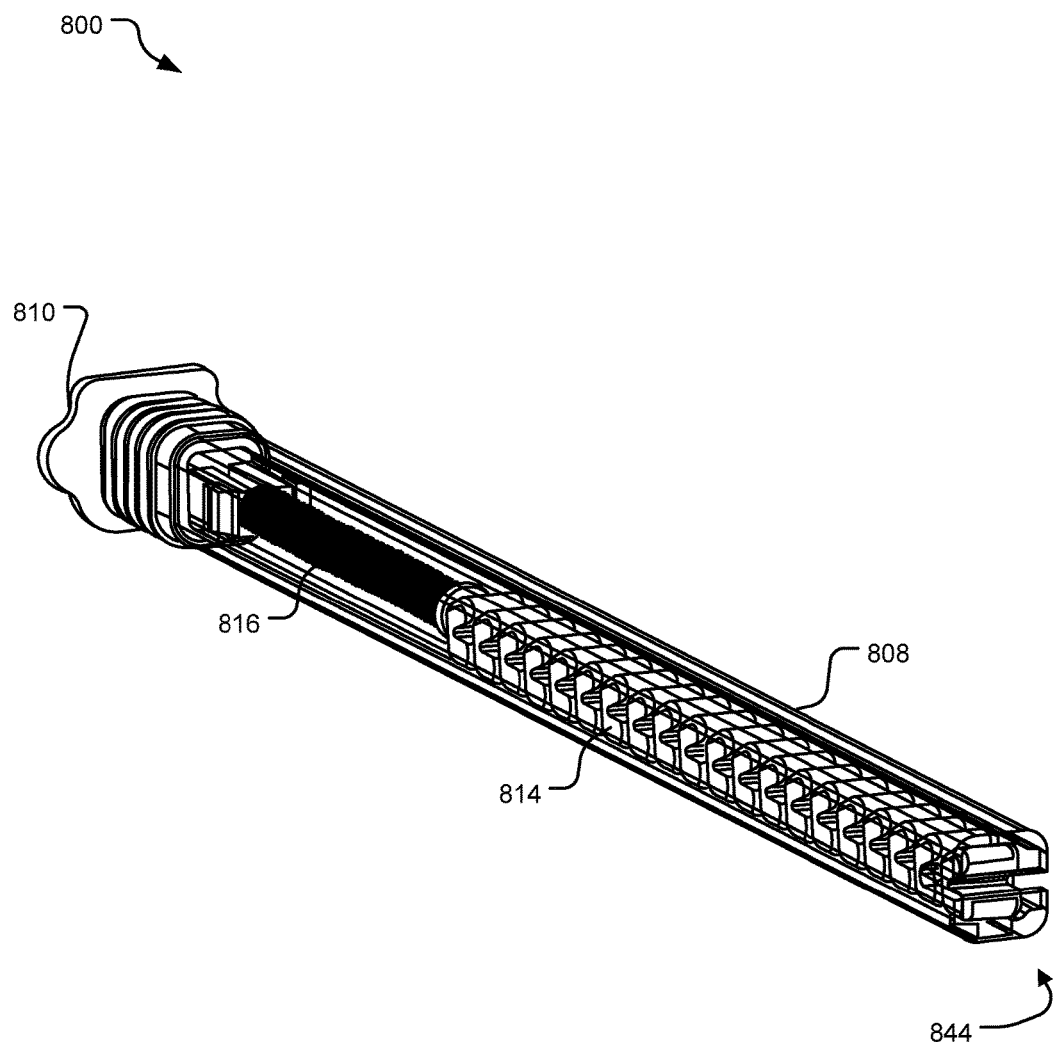
FIG. 8 illustrates a perspective view of an example fishing tool cartridge.

FIG. 8 illustrates a perspective view of an example fishing tool cartridge 800. Stacked fishing sinkers 814 are loaded in the fishing tool cartridge 808 adjacent to a spring-loaded mechanism 816. An end cap or plug 810 acts as a means of holding the pre-loaded fishing tool cartridge 808, including stacked fishing sinkers 814 and spring-loaded mechanism 816, in place in a lower lever (not shown). Once the fishing tool cartridge 808 is assembled in a lower lever, the forward pressure from the spring-loaded mechanism 816 in the fishing tool fishing tool 808 moves a fishing sinker 814 into a forward loading position in a slot (not shown). After a fishing sinker 814 is attached on a fishing line and removed from the slot, the spring-loaded mechanism 816 in the fishing tool cartridge 808 automatically moves the next fishing sinker 814 out a dispensing end 844 of the fishing tool cartridge 808 into a forward loading position.

Figure 9:
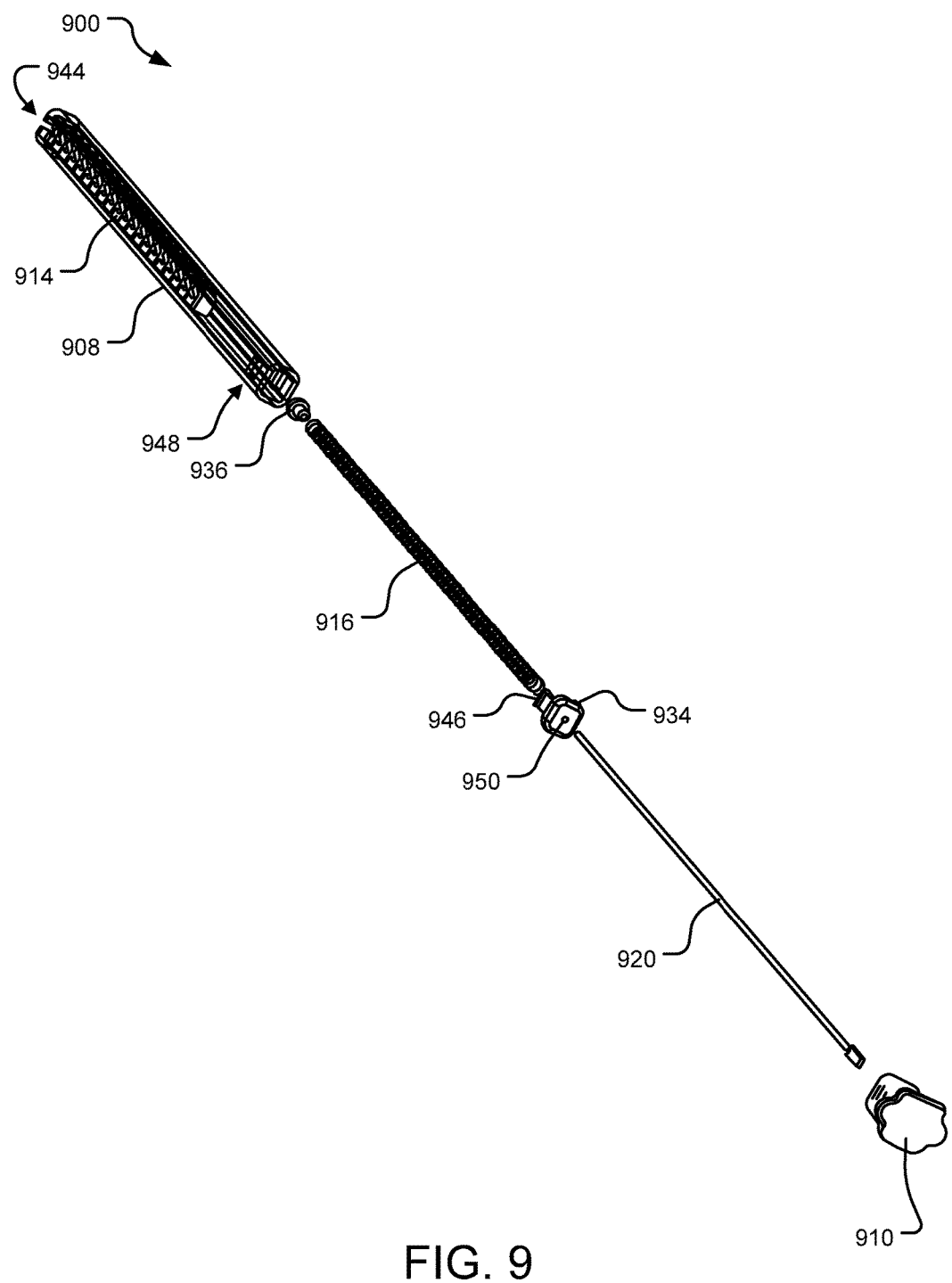
FIG. 9 illustrates a view of an example fishing tool cartridge.

FIG. 9 illustrates a view of an example fishing tool cartridge 900. Stacked fishing sinkers 914 are loaded in the fishing tool cartridge 908. FIG. 9 shows a spring-loaded mechanism 916 adjacent to the fishing tool cartridge 908, which inserts into the fishing tool cartridge 908 and provides pressure to the stacked fishing sinkers 914 once assembled. An interior cap 934 attaches to the spring-loaded mechanism 916. A loading rod 920 aligns the spring-loaded mechanism 916 as the spring-loaded mechanism is loaded into the fishing tool cartridge 908 against the stacked fishing sinkers 914. The loading rod 920 is inserted into an opening in the interior cap 934, and through an interior cap hole 950 in the center of the spring-loaded mechanism 916. With the loading rod 920 in place in the interior cap 934 and spring-loaded mechanism 916, the components can be inserted into the fishing tool cartridge 908 for loading.

The fishing tool cartridge 908 is loaded by compressing the spring-loaded mechanism 916 into the fishing tool cartridge 908. The interior cap 934 is secured adjacent to the spring-loaded mechanism 916, which is adjacent to a connector 936 at the end of the fishing tool cartridge 908. In the implementation in FIG. 9, the interior cap 934 is secured when tabs 946 of the interior cap 934 engage into fishing tool cartridge openings 948 on the fishing tool cartridge 908. However, in other implementations, other fastening, snapping, or attaching means may be used (e.g., clips, clasps, etc.).

After the interior cap 934 has engaged with the fishing tool cartridge 908 by means of the tabs 946, the loading rod 920 can be removed from an opening at the top of the interior cap 934. An end cap or plug 910 can then be placed over the interior cap 934 on the end of the fishing tool cartridge 908 and act as a means of holding the loaded fishing tool cartridge 908, including the stacked fishing sinkers 914 and spring-loaded mechanism 916, in place in a lower lever (not shown).

Once the fishing tool cartridge 908 is assembled in a lower lever, the forward pressure from the spring-loaded mechanism 916 in the fishing tool cartridge 908 moves a fishing sinker 914 into a forward loading position in a slot (not shown). After a fishing sinker 914 is attached on a fishing line and removed from the slot, the spring-loaded mechanism 916 in the fishing tool cartridge 908 automatically moves the next fishing sinker 914 out a dispensing end 944 of the fishing tool cartridge 908 into a forward loading position in the slot.

Figure 10:
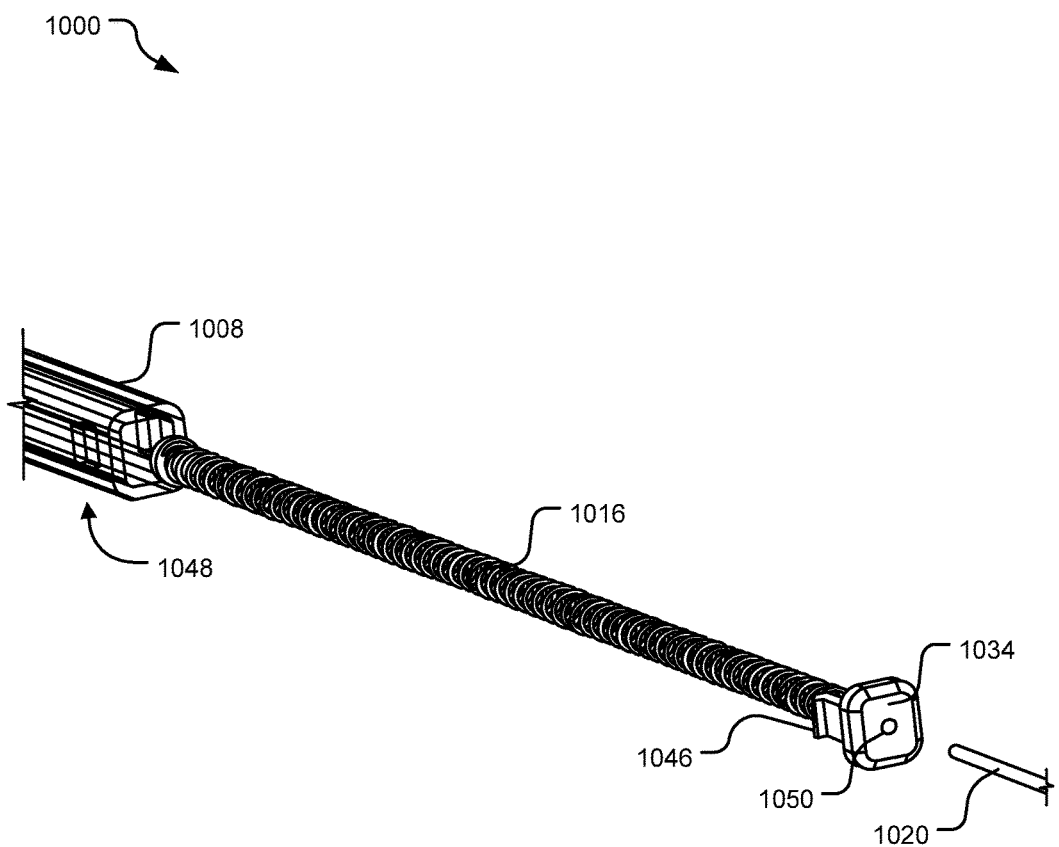
FIG. 10 illustrates a partial perspective view of an example fishing tool cartridge.

FIG. 10 illustrates a partial perspective view of an example cartridge 1000. FIG. 10 shows a spring-loaded mechanism 1016 adjacent to the fishing tool cartridge 1008, which inserts into the fishing tool cartridge 1008 and provides pressure to stacked fishing sinkers (not shown) once assembled. An interior cap 1034 attaches to the spring-loaded mechanism 1016. A loading rod 1020 aligns the spring-loaded mechanism 1016 as the spring-loaded mechanism is loaded into the fishing tool cartridge 1008 against stacked fishing sinkers. The loading rod 1020 is inserted into an opening in the interior cap 1034, and through an interior cap hole 1050 in the center of the spring-loaded mechanism 1016. With the loading rod 1020 in place in the interior cap 1034 and spring-loaded mechanism 1016, the components can be inserted into the fishing tool cartridge 1008 for loading.

The fishing tool cartridge 1008 is loaded by compressing the spring-loaded mechanism 1016 into the fishing tool cartridge 1008 until tabs 1046 of the interior cap 1034, engage into fishing tool cartridge openings 1048 on the fishing tool cartridge 1008. After the interior cap 1034 has engaged with the fishing tool cartridge 1008 by means of the tabs 1046, the loading rod 1020 can be removed from an opening at the top of the interior cap 1034. An end cap or plug (not shown) can then be placed over the interior cap 1034 on the end of the fishing tool cartridge 1008 and act as a means of holding the loaded cartridge 1008, including stacked fishing sinkers and the spring-loaded mechanism 1016, in place in a lower lever (not shown).

Figure 11:
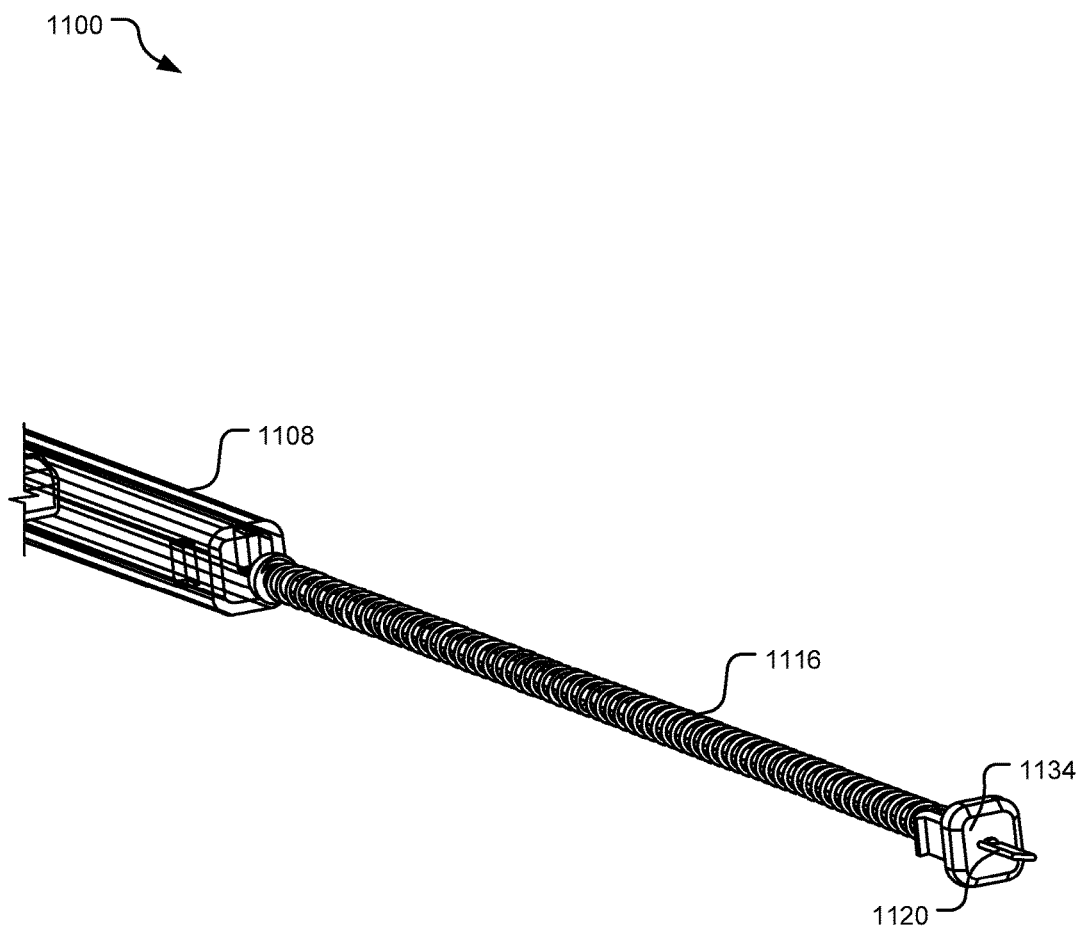
FIG. 11 illustrates a partial perspective view of an example fishing tool cartridge.

FIG. 11 illustrates a partially perspective view of an example cartridge 1100. FIG. 11 shows a spring-loaded mechanism 1116 adjacent to the fishing tool cartridge 1108, which inserts into the fishing tool cartridge 1108 and provides pressure to stacked fishing sinkers (not shown) once assembled. An interior cap 1134 attaches to the spring-loaded mechanism 1116. A loading rod 1120 aligns the spring-loaded mechanism 1116 as the spring-loaded mechanism is loaded into the fishing tool cartridge 1108 against stacked fishing sinkers. In this implementation, the loading rod 1120 is already inserted into the interior cap 1134, and through the spring-loaded mechanism 1116. With the loading rod 1120 in place in the interior cap 1134 and spring-loaded mechanism 1116, the components can be inserted into the fishing tool cartridge 1108 for loading.

Figure 12:
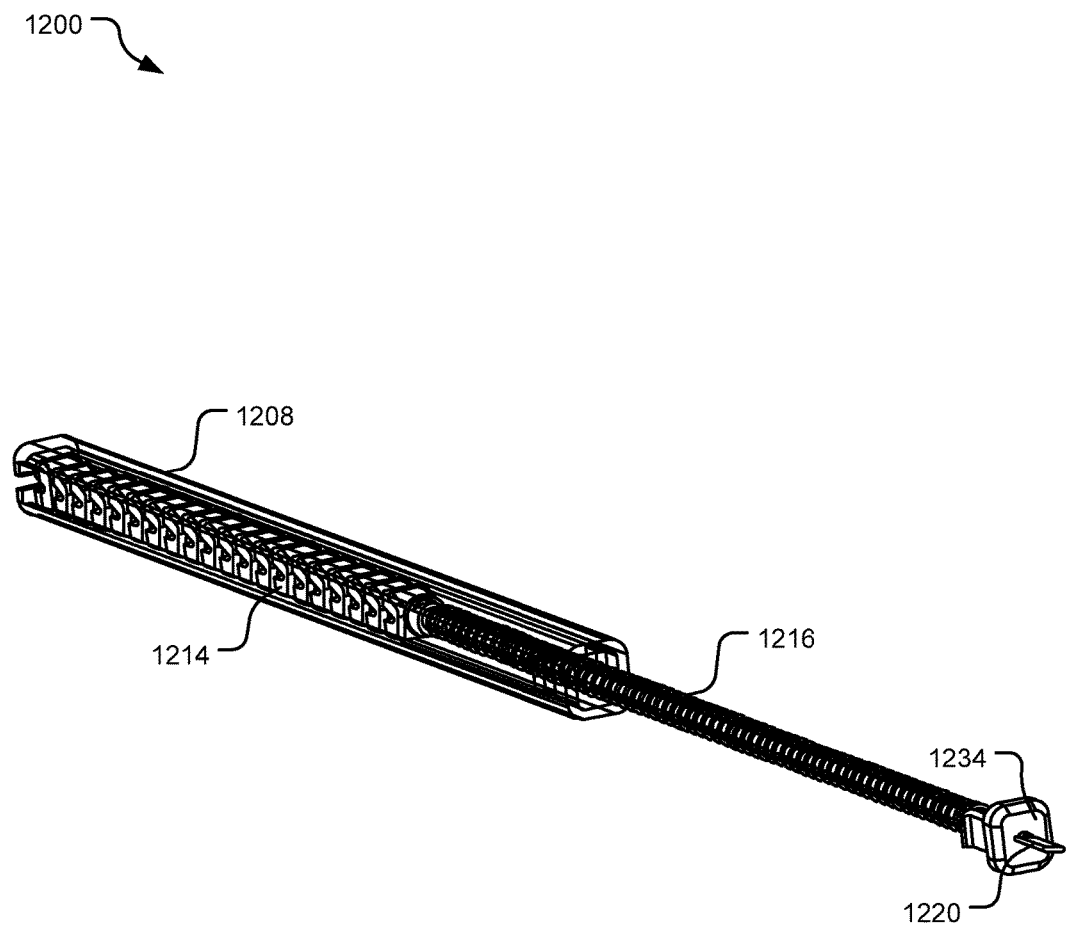
FIG. 12 illustrates a partial perspective view of an example fishing tool cartridge.

FIG. 12 illustrates a partially perspective view of an example cartridge 1200. FIG. 12 shows a spring-loaded mechanism 1216 adjacent to the fishing tool cartridge 1208, which inserts into the fishing tool cartridge 1208 and provides pressure to stacked fishing sinkers 1214 once assembled. An interior cap 1234 attaches to the spring-loaded mechanism 1216. A loading rod 1220 aligns the spring-loaded mechanism 1216 as the spring-loaded mechanism 1216 is loaded into the fishing tool cartridge 1208 against stacked fishing sinkers 1214. In this implementation, the loading rod 1220 is in place in the interior cap 1234 and spring-loaded mechanism 1216, and the components are partially assembled in the fishing tool cartridge 1208.

Figure 13:
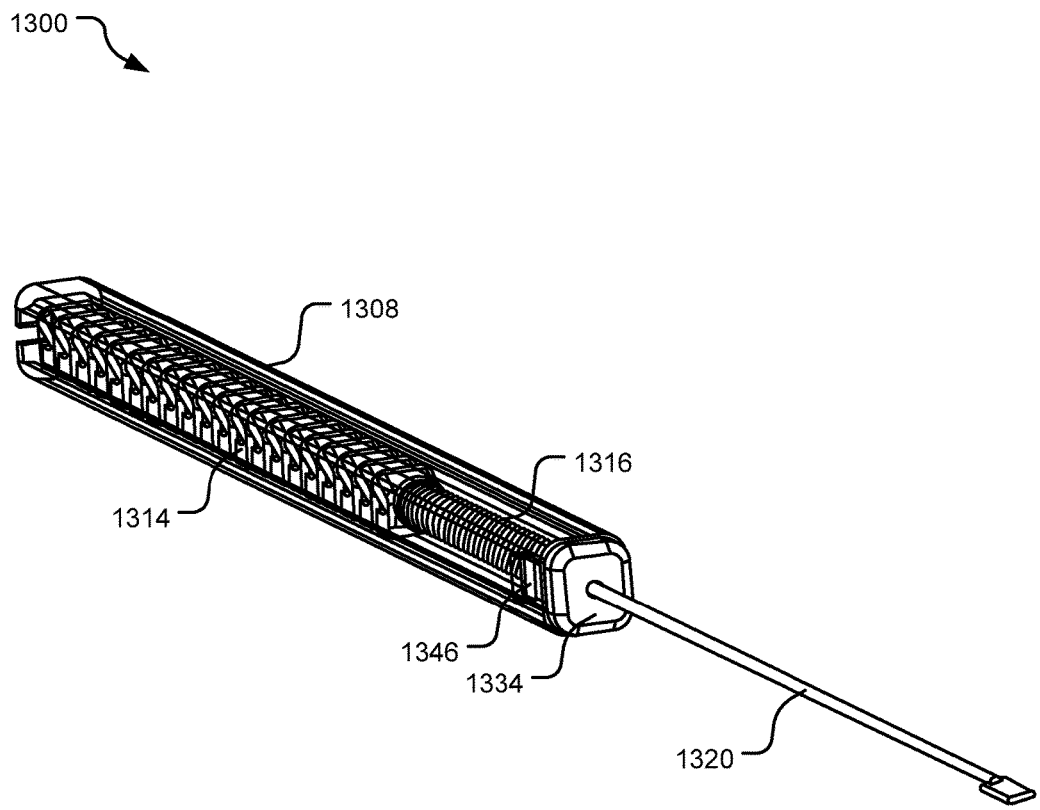
FIG. 13 illustrates a perspective view of an example fishing tool cartridge.

FIG. 13 illustrates a perspective view of an example cartridge 1300. FIG. 13 shows a spring-loaded mechanism 1316 in an assembled cartridge 1308, providing pressure to stacked fishing sinkers 1314. An interior cap 1334 is attached to the spring-loaded mechanism 1316. A loading rod 1320 aligns the spring-loaded mechanism 1316 in the fishing tool cartridge 1308 against stacked fishing sinkers 1314. In this implementation, the loading rod 1320, the interior cap 1334, and the spring-loaded mechanism 1316 are all assembled in the fishing tool cartridge 1308.

The fishing tool cartridge 1308 is loaded by compressing the spring-loaded mechanism 1316 into the fishing tool cartridge 1308. In this implementation, tabs 1346 of the interior cap 1334 engage into cartridge openings (not shown) on the fishing tool cartridge 1308.

Figure 14:
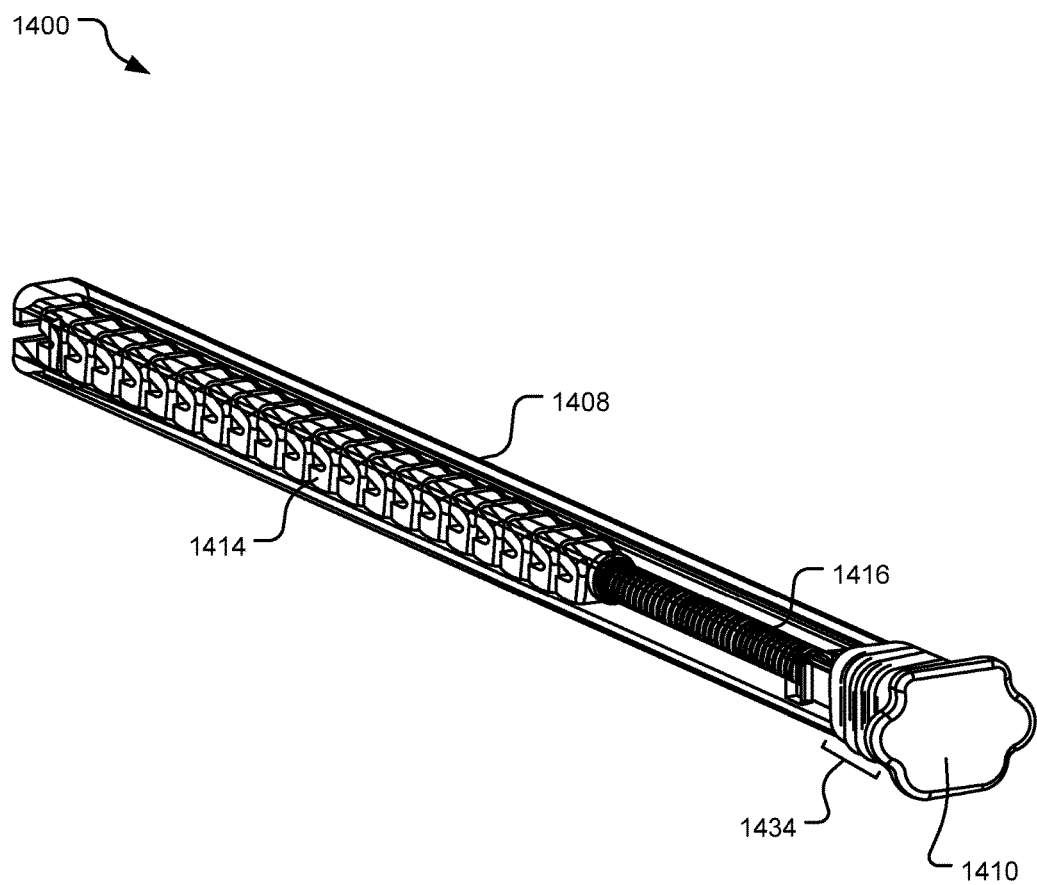
FIG. 14 illustrates a perspective view of an example fishing tool cartridge.

FIG. 14 illustrates a perspective view of an example cartridge 1400. FIG. 14 shows the fishing tool cartridge 1408 in a fully loaded position with a plug 1410 placed over an interior cap (not shown) on the end of the fishing tool cartridge 1408. FIG. 14 shows a spring-loaded mechanism 1416 in an assembled cartridge 1408, providing pressure to stacked fishing sinkers 1414. An interior cap 1434 is attached to the spring-loaded mechanism 1416. In this implementation, the interior cap 1434 and the spring-loaded mechanism 1416 are all assembled in the fishing tool cartridge 1408. The fishing tool cartridge 1408 is loaded by compressing the spring-loaded mechanism 1416 into the fishing tool cartridge 1408. An end cap or plug 1410 covers an interior cap on the end of the fishing tool cartridge 1408 and acts as a means of holding the loaded cartridge 1408, including stacked fishing sinkers 1414 and the spring-loaded mechanism 1416, in place in a lower lever (not shown).

Figure 15:
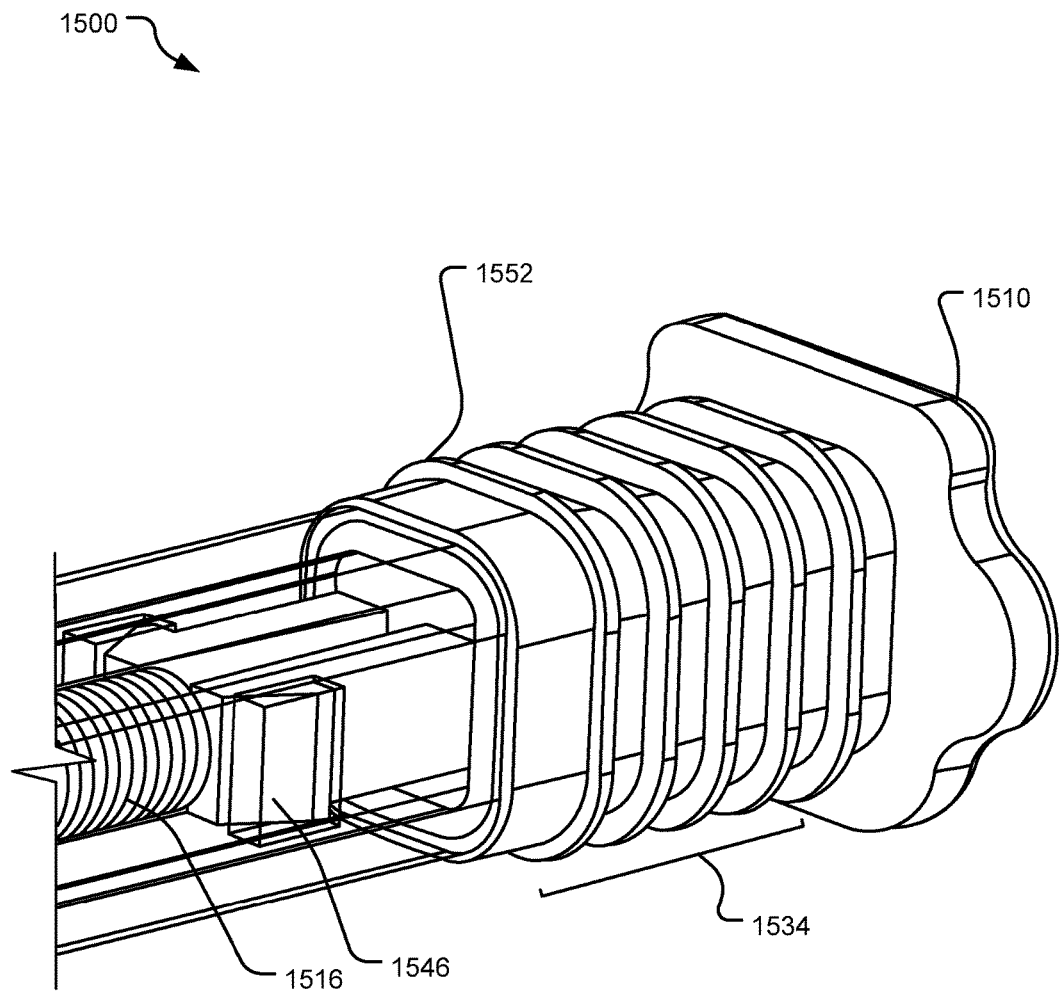
FIG. 15 illustrates a partial perspective view of an example fishing tool cartridge.

The securing mechanism of attaching an interior cap 1534 and an end cap 1510 to a fishing tool assembly and cartridge can vary, and some examples are described in FIGS. 15-18. FIG. 15 illustrates a perspective partial view of an example cartridge 1500. A plug 1510 is located in place over the interior cap 1534. Tabs 1546 on the interior cap 1534 are engaged with tab openings (not shown) to secure the end cap 1510 and provide a back stop for the compressed spring-loaded mechanism 1516.

Figure 16:
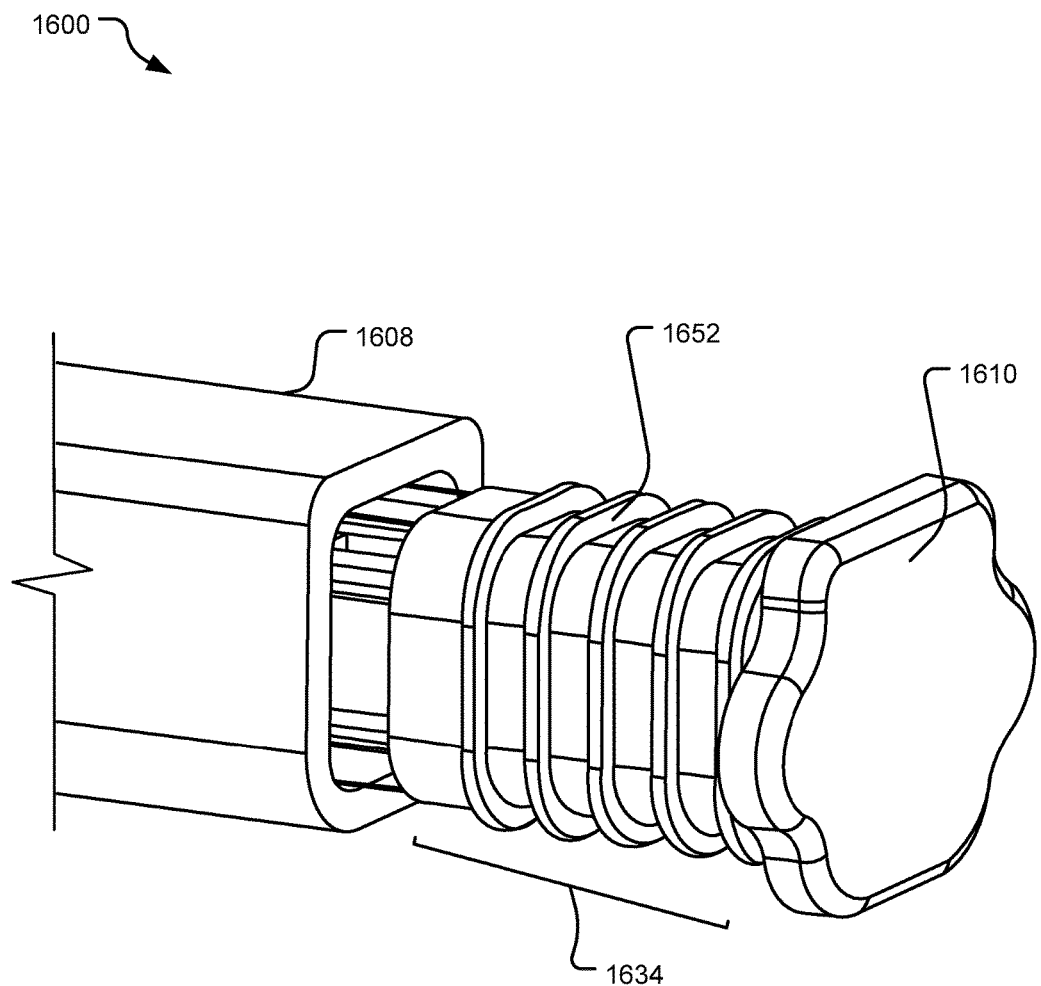
FIG. 16 illustrates a partial perspective view of an example fishing tool cartridge.

FIG. 16 illustrates a perspective partial view of an example cartridge 1600. A plug 1610 is located in place over an interior cap 1634. The interior cap 1634 is configured to fit in a cartridge 1608 via a friction fit by ridges 1652 on interior cap 1634 the to secure the end cap 1610 and provide a back stop for the compressed spring-loaded mechanism (not shown).

Figure 17:
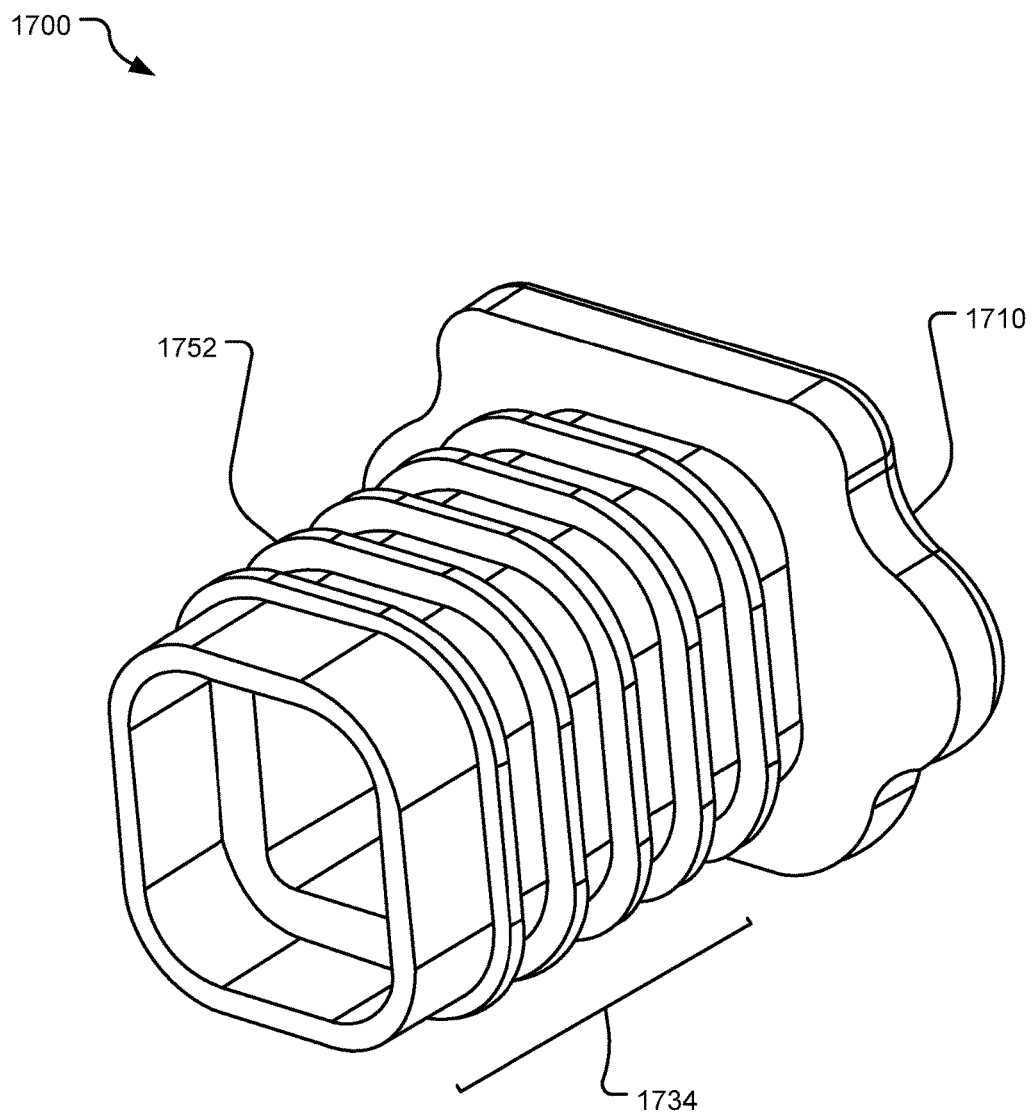
FIG. 17 illustrates a partial perspective view of an example end cap assembly.

FIG. 17 illustrates a perspective partial view of an example end cap assembly 1700. A plug 1710 is located adjacent an interior cap 1734. The interior cap 1734 is configured to fit in a cartridge (not shown) via a friction fit by ridges 1752 on interior cap 1734 to secure the end cap 1710 and provide a back stop for the compressed spring-loaded mechanism (not shown).

Figure 18:
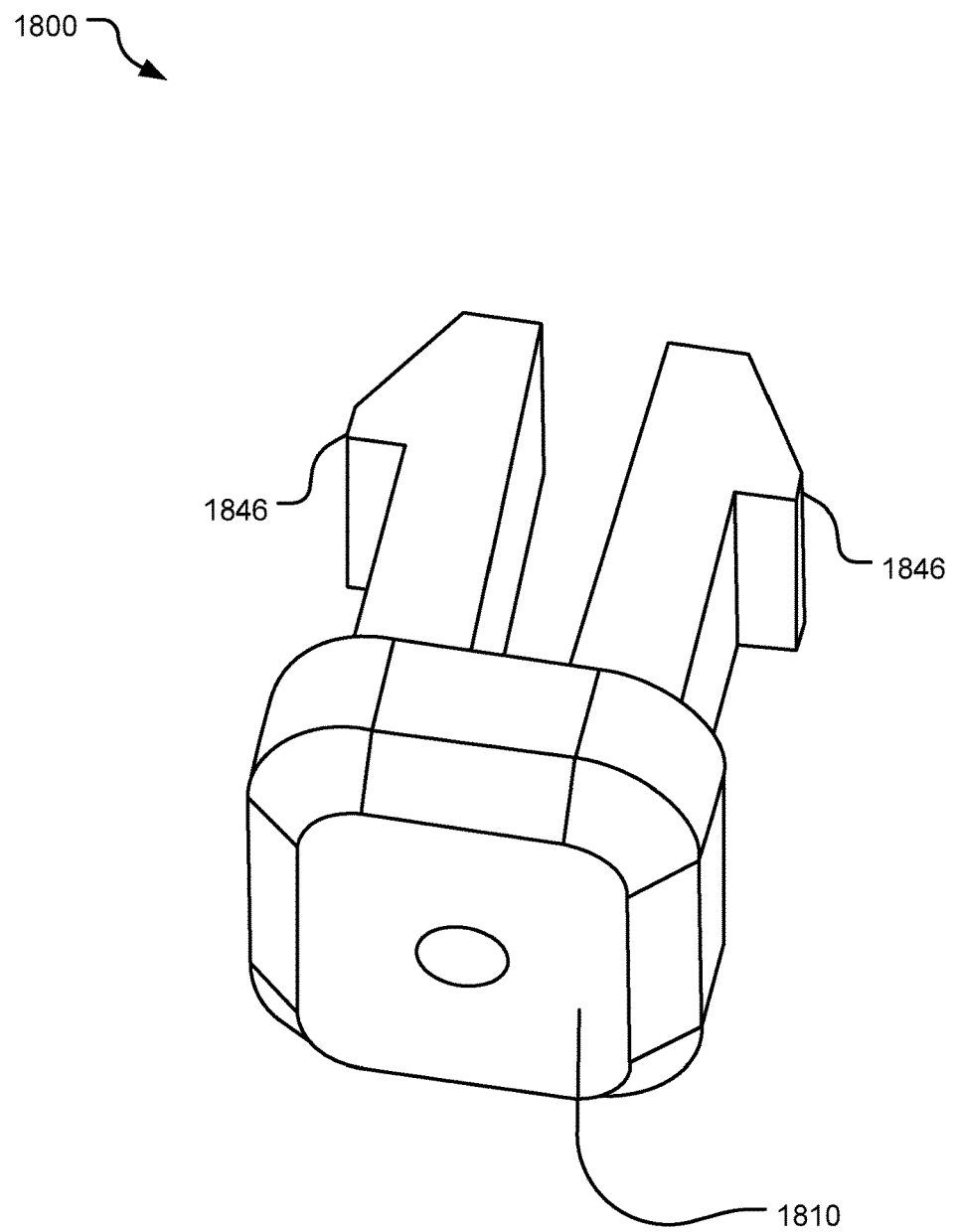
FIG. 18 illustrates a partial perspective view of an example interior cap assembly.

FIG. 18 illustrates a perspective view of an example interior cap assembly 1800. The end cap 1810 in this implementation is designed with two flexible tabs 1846. The tabs 1846 enable the end cap 1810 to engage with the fishing tool cartridge (not shown) upon loading, and lock into place at the open end of the fishing tool cartridge. This mechanism secures the spring-loaded mechanism (not shown) in place within the fishing tool cartridge, allowing it to provide forward pressure on the fishing sinkers (not shown) within the fishing tool cartridge.

Figure 19:
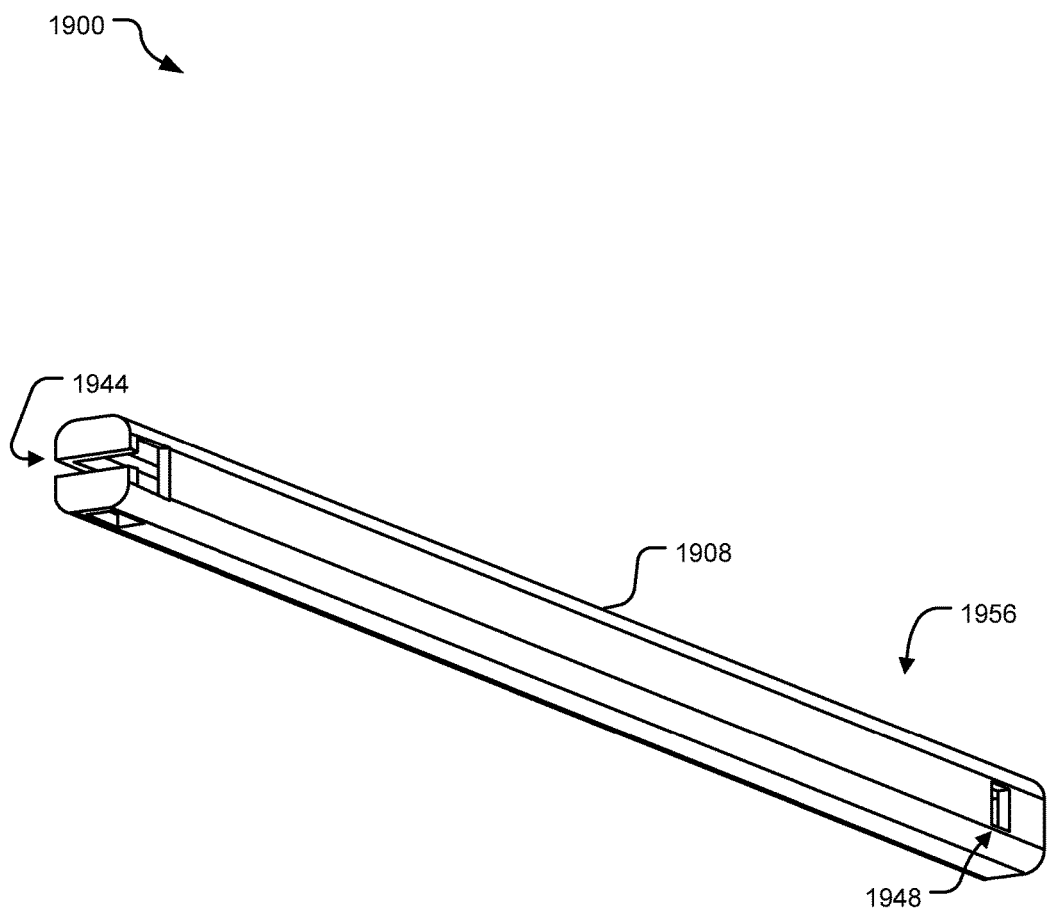
FIG. 19 illustrates a perspective view of an example fishing tool cartridge.

FIG. 19 illustrates a perspective view of an example cartridge 1900. Cartridge openings 1948 are located at a first end 1956 of the fishing tool cartridge 1908 for engagement with tabs on an interior cap (not shown). Fishing sinkers (not shown) are dispensed from a dispensing end 1944 of the fishing tool cartridge 1908. The dispensing end 1944 of the fishing tool cartridge 1908 aligns with a slot on a lower lever (as described in FIGS. 1-2 and 5-6) of a fishing assembly for insertion of a fishing line, and for the removal of an attached fishing sinker.

Figure 20:
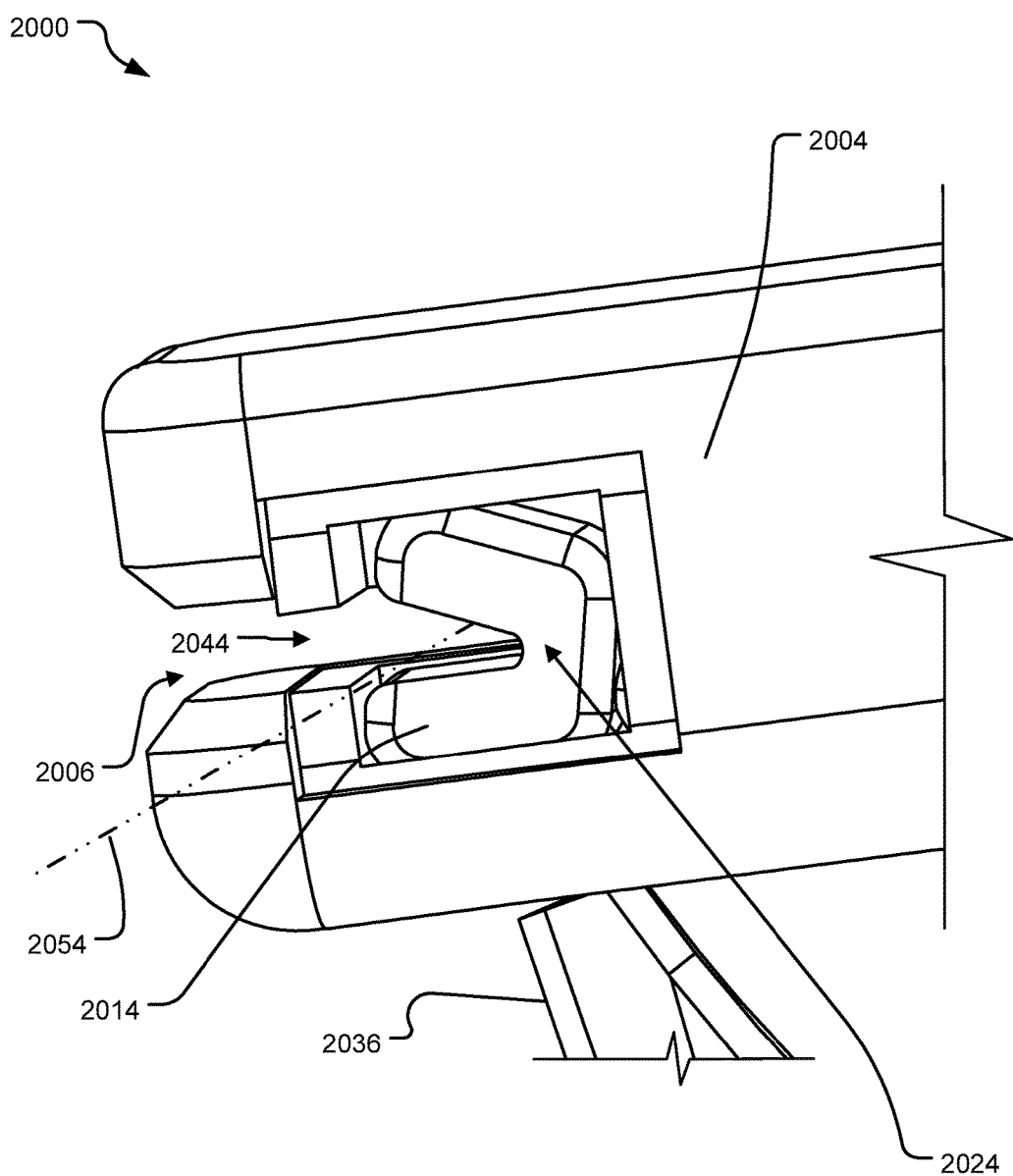
FIG. 20 illustrates a partial side view of an example fishing tool assembly.

FIG. 20 illustrates a side partial view of an example fishing tool assembly 2000. A slot 2006 in the end of a lower lever 2004, where fishing line 2054 (depicted as a dotted line) can be inserted. Once the fishing line is inserted into the slot 2006 and into a fishing sinker 2014, a jaw (not shown) terminating with a tooth 2036 at an end of the upper lever (not shown), closes and the tooth 2036 moves upward through an aperture (not shown) in the underside of the lower lever 2004, as a result of downward pressure on the upper lever 102 translating through a bolt (not shown) into upward pressure on the jaw 2018. As the tooth 2036 enters the aperture on the underside of the lower lever 2004, it comes in contact with the open fishing sinker 2014, applying pressure, which squeezes the fishing sinker 2014 closed around the inserted fishing line 2054. After the fishing sinker 2014 has closed around the inserted fishing line 2054, the upper lever can be released, returning to its original open position. By returning to its original open position, the jaw 2018 of the upper lever opens and the tooth 2036 withdraws from the aperture on the underside of the lower lever 2004. At this point, the attached fishing sinker 2014 can be removed from the fishing tool assembly through the side opening 2024 shown at the side of the lower lever 2004.

Figure 21:
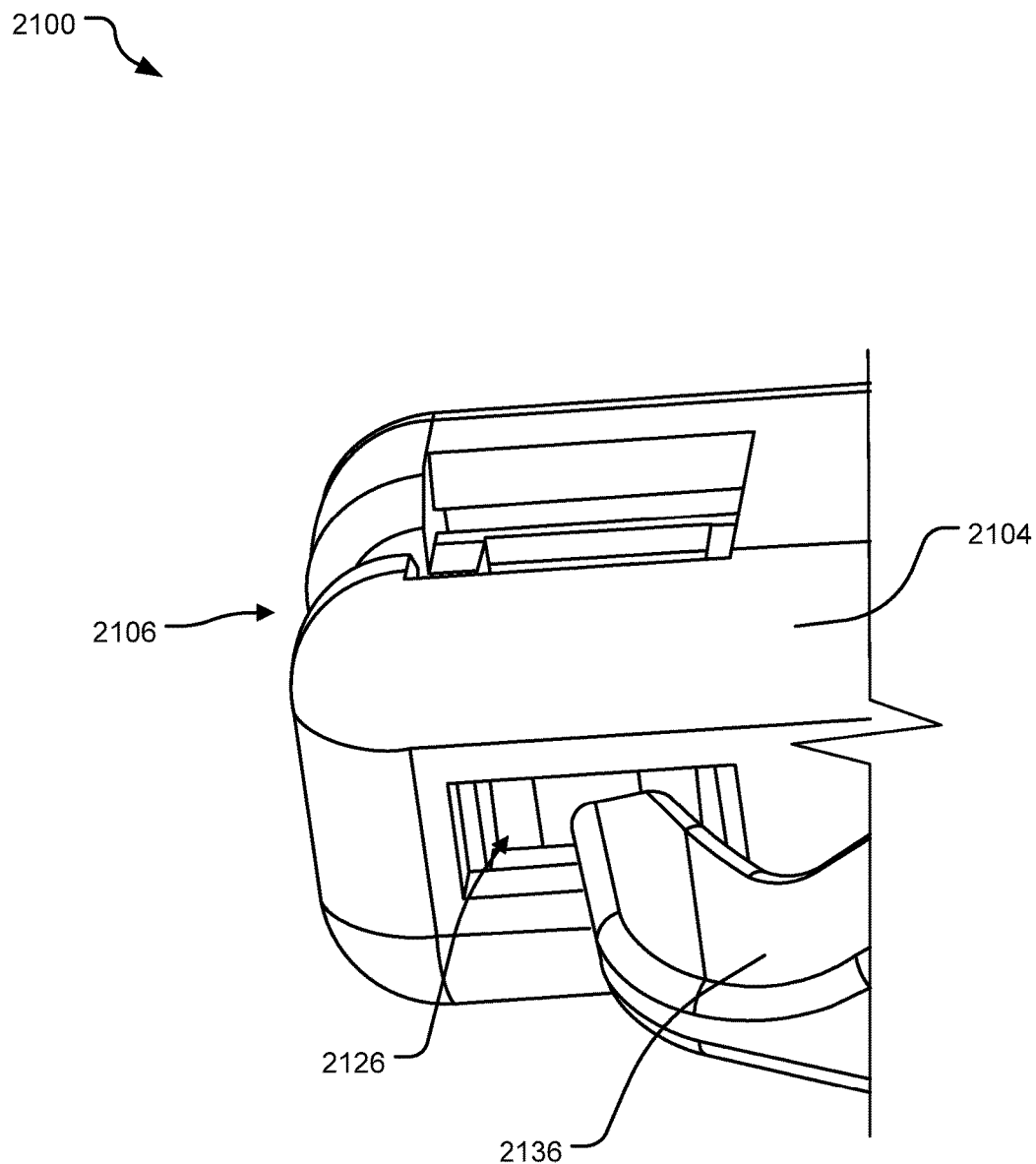
FIG. 21 illustrates a partial bottom perspective view of an example fishing tool assembly.

FIG. 21 illustrates a partial, bottom perspective view of an example fishing tool assembly 2100. An aperture 2126 in the lower level 2104 provides an entry point for a tooth 2136 of the upper lever (not shown). Through the aperture 2126, the tooth 2136 rises making contact with a loaded fishing sinker (not shown), applying upward pressure to the fishing sinker, and closing the fishing sinker around an inserted fishing line (not shown).

Figure 22:
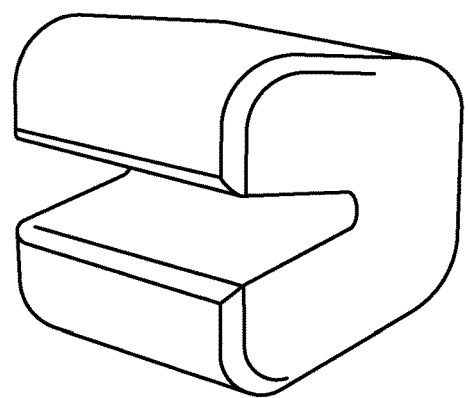
FIG. 22 illustrates a partial bottom perspective view of an example split shot sinker.

FIG. 22 illustrates a perspective view of an example split shot sinker 2200. Split shot sinker 2200 is a rectangular-shaped sinker with rounded corners. The shape of split shot sinker 2200 provides the capability of the split shot sinker 2200 to be inserted into a rectangular-shaped fishing tool cartridge, stacked with other split shot sinkers 2200, compressed by a spring-loaded mechanism, and loaded into a dispensing end of the fishing tool cartridge, which is in alignment with a slot located at a first end of a lower lever, without rotating. The fishing tool assembly descriptions described herein are specifically tailored to rectangular-shaped sinkers with rounded corners. However, in other implementations, a variety of fishing sinker sizes and shapes may be used, specific to a variety of fishing applications and functions. For example, a split shot sinker 2200 may be rectangular-shaped with straight edges on the corners rather than rounded corners.

Figure 23:
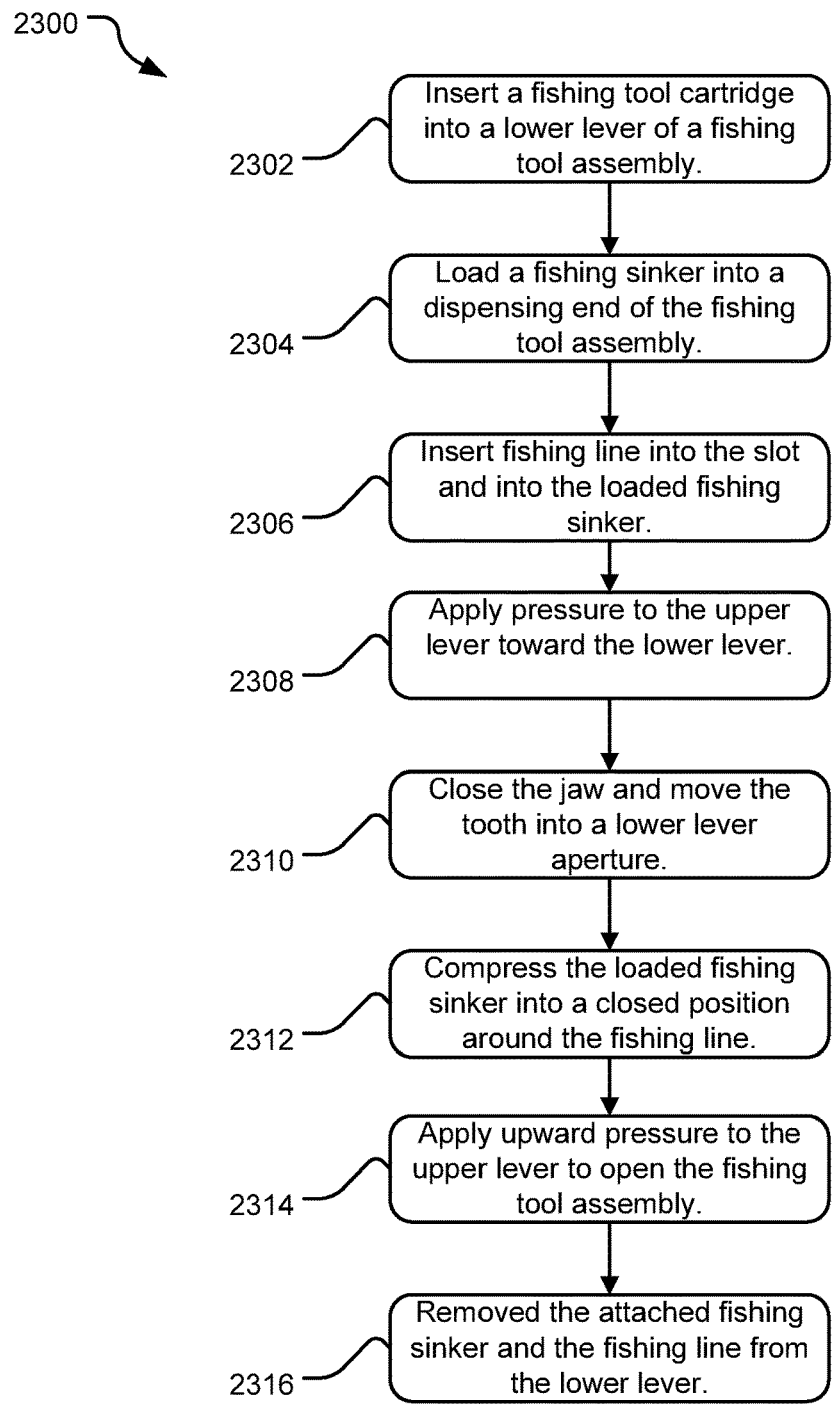
FIG. 23 is example operations for compressing a fishing sinker with the disclosed fishing tool assembly.

FIG. 23 is example operations 2300 for compressing a fishing sinker with the disclosed fishing tool assembly. The operations include squeezing one lever of a fishing tool assembly via a spring-loaded mechanism and effectively and efficiently attaching a fishing sinker directly to a fishing line.

A fishing tool cartridge is a spring-loaded, reloadable cartridge configured to house fishing sinkers that can be inserted inside a lower lever of the disclosed fishing tool assembly. In an operation 2302, the fishing tool cartridge inserts into a second end of the lower lever until a dispensing end of the fishing tool cartridge is aligned with a slot in the first end of the lower lever.

In an operation 2304, a fishing sinker loads into a dispensing end of the fishing tool cartridge with a spring-loaded mechanism. A spring in the fishing tool cartridge expands and pushes or loads the fishing sinker. The loading of the fishing sinker can occur automatically.

In an operation 2306, a fishing line inserts into the slot in the first end of the lower lever of the fishing tool assembly, and into the fishing sinker in the dispensing end of the fishing tool cartridge.

Once the fishing line is in place, in an operation 2308, downward pressure is applied to the second end of the upper lever, which rotates around an axis of a hinge in a direction toward the lower lever, until the fishing tool assembly is in a closed position.

In an operation 2310, a jaw terminating with a tooth located on a first end of the upper lever closes and the tooth moves upward into an aperture in the bottom of the lower lever contacting the underside of the fishing sinker.

In an operation 2312, upward pressure from operation 2310 causes the loaded fishing sinker located in the dispensing end of the fishing tool cartridge in the lower lever to compress into a closed position around the fishing line. Operation 2312 can occur simultaneously with operations 2308 and 2310.

In an operation 2314, the second end of the upper lever moves upward and the fishing tool assembly moves to an open position. Pressure is released, the jaw opens, and the tooth lowers out from the aperture in the first end of the lower lever.

In an operation 2316, the fishing line and the compressed fishing sinker are removed from the fishing tool assembly via a side opening of the lower lever. Or, alternatively, the fishing line can slide perpendicular to the lower lever, removing only the attached sinker from the side opening but maintaining the fishing line in the slot for subsequent attachment of one or more additional fishing sinkers to the fishing line. The forward pressure from the loading spring in the fishing tool cartridge moves another fishing sinker into a forward loading position in the slot. After operation 2316, the examples operations 2300 can end or start again.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An assembly, comprising:
   a lower lever having a first end and a second end;
   the first end of the lower lever has a slot configured to receive a fishing line;
   the first end of the lower lever has an aperture which extends through a surface of the lower lever toward the slot; and
   an upper lever having a first end and a second end;
   the first end of the upper lever has a tooth integrally formed thereon, the tooth of the upper lever extending in a direction of the lower lever;
   wherein the upper lever is configured to rotate around an axis of a hinge which connects the upper lever to the lower lever;
   wherein the tooth of the upper lever is configured to pass through the aperture of the lower lever, when the second end of the upper lever is rotated in a downward direction toward the second end of the lower lever, to compress a fishing sinker from an open position to a closed position around the fishing line.

2. The assembly of claim 1, wherein the lower lever and the upper lever are separated by a spring-loaded mechanism.

3. The assembly of claim 1, further comprising a fishing tool cartridge configured to house a plurality of fishing sinkers.

4. The assembly of claim 3, wherein the fishing tool cartridge is configured to slide into the second end of the lower lever until a dispensing end of the fishing tool cartridge is aligned with the slot in the first end of the lower lever, and the dispensing end of the fishing tool cartridge includes an aperture aligned with the aperture of the lower lever through which the tooth of the upper lever is configured to pass through in compressing the fishing sinker around the fishing line.

5. The assembly of claim 4, wherein the fishing tool cartridge has a spring-loaded mechanism configured to automatically load a fishing sinker into the dispensing end of the fishing tool cartridge to receive the fishing line via the slot.

6. The assembly of claim 5, wherein the fishing sinker and the fishing tool cartridge are rectangular-shaped.

7. An apparatus, comprising:
   a lower lever having a first end and a second end, the first end including an end surface, side surfaces, and a bottom surface;
   the first end of the lower lever has a slot configured to receive a fishing line, the slot extending through the end surface of the lower lever in a direction of the longitudinal axis of the lower lever;
   the first end of the lower lever has an aperture extending through the bottom surface of the lower lever;
   the first end of the lower lever has a side opening extending through the side surfaces of the lower lever; and
   an upper lever having a first end and a second end;
   the first end of the upper lever has a tooth integrally formed thereon, the tooth extending in a direction of the lower lever;
   wherein the upper lever is configured to rotate around an axis of a hinge in a direction toward the lower lever;
   wherein the tooth of the upper lever is configured to move into the aperture of the lower lever to compress a fishing sinker into a closed position around the fishing line;
   wherein the side opening of the lower lever is sized large enough for the fishing sinker compressed around the fishing line in the closed position to be removed from the apparatus therethrough.

8. The apparatus of claim 7, wherein the lower lever and the upper lever are separated by a spring-loaded mechanism.

9. The apparatus of claim 7, further comprising a fishing tool cartridge configured to house a plurality of fishing sinkers and to slide into the second end of the lower lever until a dispensing end of the fishing tool cartridge is aligned with the slot of the lower lever, and the dispensing end of the fishing tool cartridge includes an aperture aligned with the aperture of the lower lever through which the tooth of the upper lever is configured to pass through in compressing the fishing sinker around the fishing line.

10. The apparatus of claim 9, wherein the fishing tool cartridge has a spring-loaded mechanism configured to automatically load a fishing sinker into the dispensing end of the fishing tool cartridge to receive the fishing line via the slot.

11. The apparatus of claim 9, wherein the fishing tool cartridge is reloadable.

12. A method comprising:
   inserting a fishing line into a slot in a first end of a lower lever of a fishing tool assembly;
   rotating an upper lever of the fishing tool assembly around an axis of a hinge in a direction toward the lower lever, such that a tooth integrally formed on the upper lever moves into an aperture in the first end the lower lever; and
   compressing a fishing sinker around the fishing line with the tooth via the rotation of the upper lever.

13. The method of claim 12, further comprising separating the lower lever and the upper lever by a spring-loaded mechanism.

14. The method of claim 12, further comprising sliding a fishing tool cartridge containing fishing sinkers into a second end of the lower lever of the fishing tool assembly until the fishing tool cartridge reaches a dispensing end of the fishing tool cartridge aligned with the slot in the first end of the lower lever.

15. The method of claim 14, further comprising automatically loading a fishing sinker into the dispensing end of the fishing tool cartridge with a spring-loaded mechanism to receive the fishing line via the slot.

16. The method of claim 1, further comprising removing the fishing line and the compressed fishing sinker from the assembly via a side opening of the lower lever.

17. The assembly of claim 1, wherein first end of the lower lever comprises a side opening sized large enough for the fishing sinker compressed around the fishing line in the closed position to be removed from the assembly therethrough.

18. The assembly of claim 1, wherein the first end of the upper lever comprises a jaw located adjacent to the hinge and terminating with the tooth.

19. The apparatus of claim 7, wherein the first end of the lower lever, the fishing sinker and the fishing tool cartridge are rectangular-shaped.

20. The apparatus of claim 7, wherein the first end of the upper lever comprises a jaw located adjacent to the hinge and terminating with the tooth.

\* \* \* \* \*